(12) United States Patent
Jones

(10) Patent No.: US 9,644,611 B2
(45) Date of Patent: *May 9, 2017

(54) VERTICAL AXIS WIND TURBINES

(71) Applicant: Thomas Jones, Santa Fe, TX (US)

(72) Inventor: Thomas Jones, Santa Fe, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/805,047

(22) Filed: Jul. 21, 2015

(65) Prior Publication Data

US 2015/0322920 A1   Nov. 12, 2015

Related U.S. Application Data

(63) Continuation-in-part of application No. 14/195,109, filed on Mar. 3, 2014, now Pat. No. 9,133,820, which is a continuation-in-part of application No. 13/927,324, filed on Jun. 26, 2013, now Pat. No. 8,704,394, which is a continuation-in-part of application No. 13/222,629, filed on Aug. 31, 2011, now Pat. No. 8,497,592.

(51) Int. Cl.

| *F03D 9/02* | (2006.01) |
| *F03D 9/00* | (2016.01) |
| *F03D 3/06* | (2006.01) |
| *F03D 3/00* | (2006.01) |
| *F03D 9/10* | (2016.01) |
| *F03D 80/80* | (2016.01) |
| *F03D 13/20* | (2016.01) |

(52) U.S. Cl.
CPC ............ *F03D 9/002* (2013.01); *F03D 3/005* (2013.01); *F03D 3/06* (2013.01); *F03D 9/00* (2013.01); *F03D 9/003* (2013.01); *F03D 9/007* (2013.01); *F03D 9/10* (2016.05); *F03D 13/20* (2016.05); *F03D 80/82* (2016.05); *F05B 2240/211* (2013.01); *F05B 2240/9112* (2013.01); *Y02B 10/30* (2013.01); *Y02E 10/728* (2013.01); *Y02E 10/74* (2013.01)

(58) Field of Classification Search
None
See application file for complete search history.

(56) References Cited

U.S. PATENT DOCUMENTS

| 5,256,034 A | * | 10/1993 | Sultzbaugh | ............. | F03D 3/061 |
| | | | | | 415/914 |
| 7,186,802 B2 | | 3/2007 | Youakim et al. | | |
| 7,303,369 B2 | | 12/2007 | Rowan et al. | | |
| 7,352,076 B1 | | 4/2008 | Gabrys | | |
| 7,677,862 B2 | * | 3/2010 | Boatner | ................ | F03D 3/068 |
| | | | | | 415/4.2 |
| 8,013,464 B2 | * | 9/2011 | Stern | ...................... | F03D 3/005 |
| | | | | | 290/44 |
| 8,497,592 B1 | | 7/2013 | Jones | | |
| 2006/0210389 A1 | * | 9/2006 | St-Germain | ............ | F03D 3/005 |
| | | | | | 415/4.2 |

(Continued)

OTHER PUBLICATIONS

International Search Report and Written Opinion dated Jun. 16, 2015 in related International Application No. PCT/US15/18362 filed Mar. 2, 2015 (7 pages).

*Primary Examiner* — Tho D Ta
(74) *Attorney, Agent, or Firm* — Dentons US LLP

(57) ABSTRACT

A device comprising a vertical axis wind turbine comprising an arm, a housing coupled to the arm, a generator housed within the housing, and a blade extending along the housing vertically.

20 Claims, 22 Drawing Sheets

(56) References Cited

U.S. PATENT DOCUMENTS

| | | | |
|---|---|---|---|
| 2006/0263198 A1 | 11/2006 | Toby Kinkaid | |
| 2007/0098563 A1 | 5/2007 | Rowan et al. | |
| 2008/0150286 A1 | 6/2008 | Fein et al. | |
| 2008/0150288 A1* | 6/2008 | Fein | B82Y 15/00 290/55 |
| 2008/0187432 A1 | 8/2008 | Cowan | |
| 2009/0200808 A1 | 8/2009 | Parmley, Sr. | |
| 2009/0224554 A1 | 9/2009 | Flynn | |
| 2009/0224606 A1 | 9/2009 | Gandy | |
| 2010/0013238 A1 | 1/2010 | Jessie et al. | |
| 2010/0101988 A1* | 4/2010 | Saeed | C02F 9/005 210/171 |
| 2010/0133850 A1* | 6/2010 | Winkler | F03D 3/005 290/55 |
| 2010/0213723 A1 | 8/2010 | Kazadi | |
| 2010/0278653 A1* | 11/2010 | Sassow | F03D 3/061 416/223 R |
| 2010/0295319 A1* | 11/2010 | Britnell | F03D 3/0427 290/55 |
| 2010/0296913 A1 | 11/2010 | Lee | |
| 2011/0025070 A1 | 2/2011 | Price | |
| 2011/0062717 A1 | 3/2011 | Price, Jr. | |
| 2011/0084495 A1* | 4/2011 | Wu | F03D 3/005 290/55 |
| 2011/0103942 A1 | 5/2011 | Green et al. | |
| 2011/0107684 A1 | 5/2011 | Flores | |
| 2011/0163551 A1* | 7/2011 | King | F03D 3/005 290/55 |
| 2012/0019002 A1 | 1/2012 | Lee | |
| 2012/0038170 A1 | 2/2012 | Stuart et al. | |
| 2012/0066879 A1* | 3/2012 | Daeschner | B25B 11/02 29/407.05 |
| 2012/0074705 A1 | 3/2012 | Stephens et al. | |
| 2012/0302228 A1 | 11/2012 | Gray | |
| 2013/0106193 A1 | 5/2013 | Bryson | |
| 2013/0263911 A1 | 10/2013 | Bryson | |

* cited by examiner

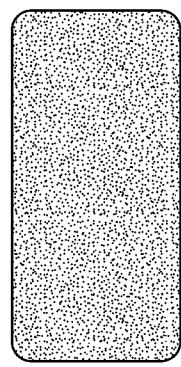
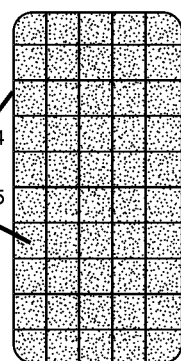
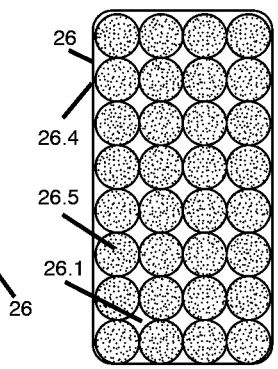
FIG. 14A          FIG. 14B          FIG. 14C
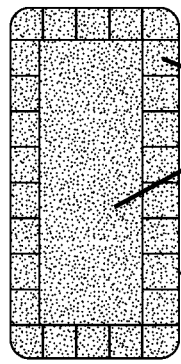
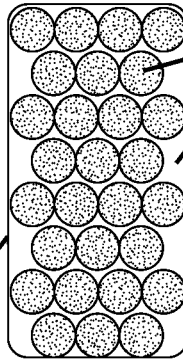
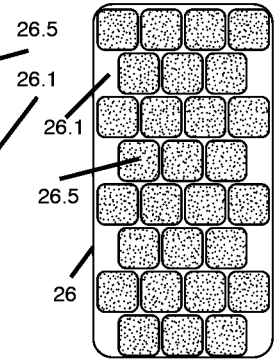
FIG. 14D          FIG. 14E          FIG. 14F

VERTICAL AXIS WIND TURBINES

CROSS-REFERENCE TO RELATED APPLICATIONS

The present application is a continuation-in-part (CIP) of U.S. patent application Ser. No. 14/195,109, filed Mar. 3, 2014; which is a CIP of U.S. patent application Ser. No. 13/927,324, filed Jun. 26, 2013, now U.S. Pat. No. 8,704,394 issued Apr. 22, 2014; which is a CIP of U.S. patent application Ser. No. 13/222,629, filed Aug. 31, 2011, now U.S. Pat. No. 8,497,592 issued Jul. 30, 2013. All of the above applications are herein fully incorporated by reference for all purposes.

TECHNICAL FIELD

Generally, the present disclosure relates to renewable energy. More particularly, the present disclosure relates to vertical axis wind turbines.

BACKGROUND

In the present disclosure, where a document, an act and/or an item of knowledge is referred to and/or discussed, whether directly and/or indirectly, then this reference and/or discussion is not an admission that the document, the act and/or the item of knowledge and/or any combination thereof was at the priority date, publicly available, known to the public, part of common general knowledge and/or otherwise constitutes prior art under the applicable statutory provisions and/or is known to be relevant to an attempt to solve any problem with which the present disclosure is concerned.

Identification of new non-fossil fuel based energy sources, which are both commercially viable and/or environmentally benign, has become an important national security and/or technological need. With increasing domestic energy consumption, such technological development not only enhances national security, reduces visual pollution, fuels economic growth, creates jobs and/or contributes to global environmental sustainability, but also reduces foreign energy dependence.

Many countries and/or businesses often commit to make better use of renewable and/or nonpolluting energy sources. Wind energy is a popular source explored by many not just because wind energy is renewable and/or nonpolluting, but also because wind energy is free. Although wind farms with acres of large wind turbines have proved relatively successful, such wind farms are relatively rare and/or generally involve substantial economic investment, visual pollution and/or contentious land use issues. A broader, simpler, more visually appealing and/or geographically universal wind turbine construction and/or management approach may be required to bring wind energy to its full potential.

Also, in United States, utility poles are ubiquitous and/or often include power transmission capabilities. In fact, miles of open roads, spreading through wide-open spaces, are lined with a seemingly endless amount of utility poles. A significant amount of wind energy, which often encounters these poles, remains underutilized. Thus, by better utilizing already existing utility poles for wind energy generation, increasing domestic energy consumption can be more effectively managed without substantial economic investment.

Additionally, some electric utility companies, such as electric distribution cooperatives, do not generate electric power. Rather, these companies purchase electricity from another entity. Thus, these companies are caught in the middle of a vibrant energy supply and/or demand market and, generally, do not have control over rising energy costs. Similarly, these companies also often face arbitrary political mandates and/or unreasonable customer demands for prompt provision of renewable energy without having any control over how to provide such energy.

Accordingly, there may be a need to more efficiently create and distribute renewable energy, decrease dependency on centralized electric energy generation, lessen fossil fuel use in electricity generation, minimize foreign energy dependence, reduce the price of electricity, create a new renewable energy business model, while implementing a job creating solution using an already existing infrastructure.

While certain aspects of conventional technologies have been discussed to facilitate the present disclosure, no technical aspects are disclaimed. The claims may encompass one and/or more of the conventional technical aspects discussed herein.

BRIEF SUMMARY

In an embodiment, a device comprises a vertical axis wind turbine comprising an arm, a housing coupled to the arm, a generator housed within the housing, and a blade extending along the housing vertically.

In an embodiment, a method comprises receiving energy from a vertical axis wind turbine comprising an arm, a housing coupled to the arm, a generator housed within the housing, and a blade extending along the housing vertically.

In an embodiment, a method comprises sending energy from a vertical axis wind turbine comprising an arm, a housing coupled to the arm, a generator housed within the housing, and a blade extending along the housing vertically.

The present disclosure may be embodied in the form illustrated in the accompanying drawings. Attention is called to the fact, however, that the drawings are illustrative. Variations are contemplated as being part of the present disclosure, limited only by the scope of the claims.

BRIEF DESCRIPTION OF THE DRAWINGS

The accompanying drawings illustrate example embodiments of the present disclosure. Such drawings are not to be construed as necessarily limiting the present disclosure. Like numbers and/or similar numbering scheme can refer to like and/or similar elements throughout.

FIG. 14A illustrates a frontal view of an example embodiment of a photovoltaic cell on a vertical axis wind turbine blade according to the present disclosure.

FIG. 14B illustrates a frontal view of an example embodiment of a photovoltaic cell array on a vertical axis wind turbine blade according to the present disclosure.

FIG. 14C illustrates a frontal view of another example embodiment of a photovoltaic cell array on a vertical axis wind turbine blade according to the present disclosure.

FIG. 14D illustrates a frontal view of an example embodiment of a photovoltaic cell enclosed via a set of photovoltaic cells arranged in a rectangular pattern on a vertical axis wind turbine blade according to the present disclosure.

FIG. 14E illustrates a frontal view of an example embodiment of a set of photovoltaic cells arranged in a numerically alternating pattern on a vertical axis wind turbine blade according to the present disclosure.

FIG. 14F illustrates a frontal view of another example embodiment of a set of photovoltaic cells arranged in a numerically alternating pattern on a vertical axis wind turbine blade according to the present disclosure.

DETAILED DESCRIPTION OF THE PREFERRED EMBODIMENTS

Figure 1A:
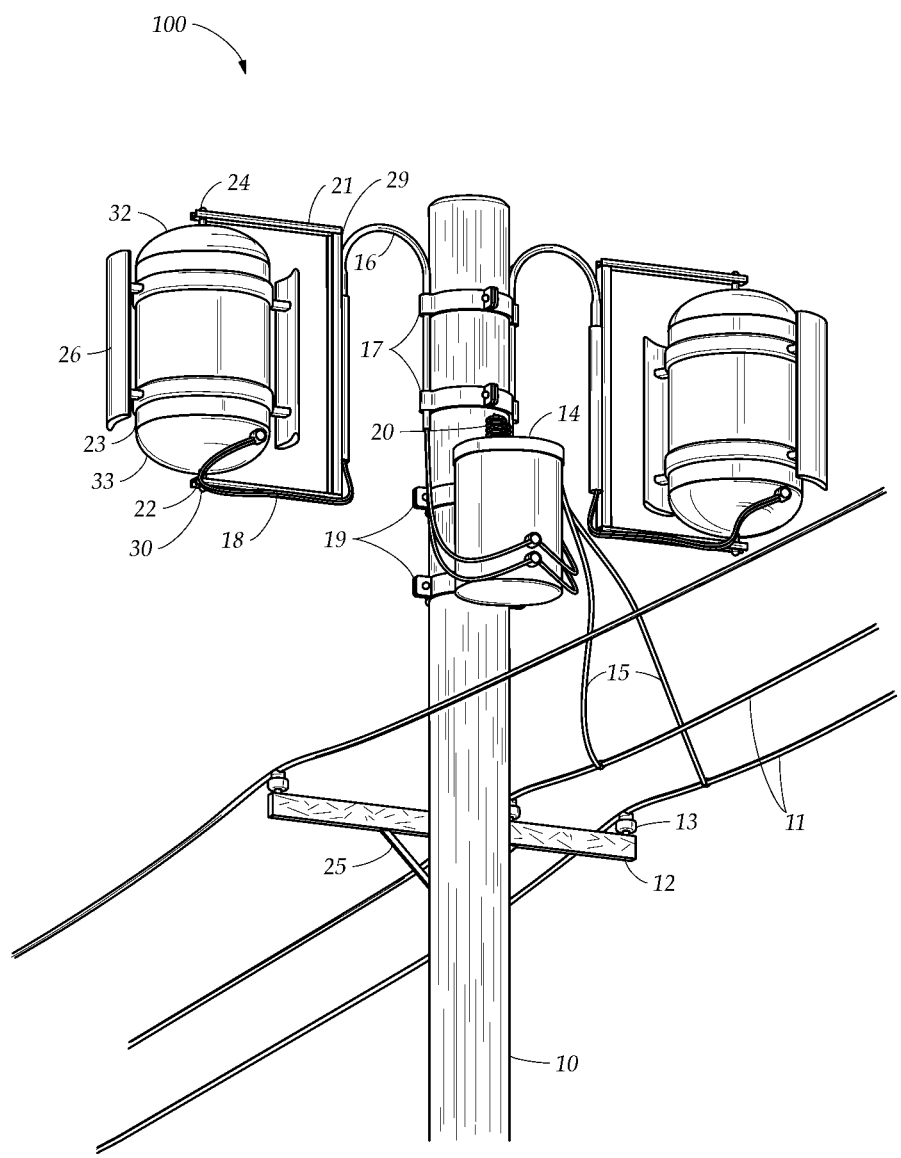
FIG. 1A illustrates an example mode of operation of a vertical axis wind turbine according to the present disclosure.

The present disclosure is now described more fully with reference to the accompanying drawings, in which example embodiments of the present disclosure are shown. The present disclosure may, however, be embodied in many different forms and should not be construed as necessarily being limited to the example embodiments set forth herein. Rather, these example embodiments are provided so that the disclosure is thorough and complete, and fully conveys the concepts of the present disclosure to those skilled in the art. In addition, features described with respect to certain example embodiments may be combined in and/or with various other example embodiments. For example, the disclosed embodiments may individually and/or collectively be components of a larger system, wherein other procedures may take precedence over or otherwise modify their application and/or operation. In addition, a number of steps may be required before, after, or concurrently with the following embodiments. Different aspects and/or elements of the example embodiments may be combined in a similar manner.

The terminology used herein can imply direct or indirect, full or partial, action or inaction. For example, when an element is referred to as being "on," "connected" or "coupled" to another element, then the element can be directly connected or coupled to the other element and/or intervening elements may be present. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer, or section discussed below could be termed a second element, component, region, layer, or section without departing from the teachings of the present disclosure.

The terminology used herein is for describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be or include formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing, and/or other any other types of manufacturing. For example, some manufacturing processes can include three-dimensional (3D) printing, laser cutting, computer numerical control (CNC) routing, milling, pressing, stamping, vacuum forming, hydroforming, injection molding, lithography, and/or others.

Any and/or all elements, as disclosed herein, can be or include, whether partially and/or fully, a solid, including a metal, a mineral, a ceramic, a glass ceramic, an organic solid, such as wood and/or a polymer, such as rubber, a composite material, a semiconductor, a nanomaterial, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof. Any and/or all elements, as disclosed herein, can be rigid, flexible, and/or any other combinations thereof. Any and/or all elements, as disclosed herein, can be identical to and/or different from each other in material, shape, size and/or any dimension, such as length, width, height, depth, area, volume, breadth, density, temperature, resistance and so forth.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can encompass both an orientation of above and below.

As used herein, the term "about" and/or "substantially" refers to a +/−10% variation from the nominal value/term. Such variation is always included in any given value/term provided herein, whether or not such variation is specifically referred thereto.

U.S. Pat. No. 7,303,369 is herein fully incorporated by reference for all purposes. However, if any disclosures are incorporated herein by reference and such incorporated disclosures conflict in part and/or in whole with the present disclosure, then to the extent of conflict, and/or broader disclosure, and/or broader definition of terms, the present disclosure controls. In addition, if such incorporated disclosures conflict in part and/or in whole with one another, then to the extent of conflict, the later-dated disclosure controls.

FIG. 1A illustrates an example mode of operation of a vertical axis wind turbine according to the present disclosure. Any element of a vertical axis wind turbine 100 can include metal, plastic or a lightweight composite material and be rustproof. Vertical axis wind turbine 100 includes a plurality of support arms 21, 22, a housing 23, a generator and a plurality of blades 26.

Arms 21, 22 are coupled to each other via a coupling rod 29. Coupling rod 29 is coupled via a bent rod 16 to a utility pole 10 above a plurality of power lines 11, which are resting on a horizontal cross-arm 12 via an insulator 13. Cross-arm 12 is supported by a support arm 25. In another example embodiment, arms 21, 22 are individually coupled to utility pole 10. In yet another example embodiment, arms 21, 22 are coupled in a V-shape, an L-shape, or an A-shape to utility pole 10. In yet still another example embodiment, arms 21, 22 are operative for coupling to a cell site, an antenna, a house roof, a transmission tower, a water tower, a lamppost, or a sign pole. In yet additional example embodiment, arms 21, 22 can form and/or be included in a bracket.

Housing 23 is coupled to arms 21, 22 via a plurality of caps 32, 33 and a plurality of shafts 24, 30, which vertically extend through arms 21, 22. Housing 23 rotates on a vertical axis of rotation and with respect to arms 21, 22.

Housing 23 also includes an outer wall defining a space within housing 23. The space is interior space and can be sealed to be waterproof and/or airtight. Although housing 23 is shown in a cylindrical shape, housing 23 can be of other shapes, such a sphere, a cube, a cuboid, a prism, a cone, a pyramid, and so forth.

A generator is stationed within the interior space. The generator generates an electric current in response to at least partial rotation of housing 23 and/or blades 26. The electric current can include an alternating current (AC). However, in another example embodiment, the electric current can include a direct current (DC). Regardless, the generator is coupled to a distribution transformer 14 via a wire 18, which conducts the generated electric current. The generator can include a generator shaft. Distribution transformer 14 is coupled to utility pole 10 via a plurality of bands 17, which also couple a bent rod 16. Bands 17 are adjustable via a plurality of adjusters 19.

Blades 26 are coupled to an external surface of the outer wall of housing 23. Blades 26 extend in a vertical direction, parallel to the external surface of housing 23. Blades 26 are coupled to the external surface of housing 23 via a connector and a band extending around the outer wall of housing 23. In another example embodiment, the band can rotate with respect to the generator and/or housing 23. At least one of blades 26 extends in a rectilinear manner, but can extend in a sinusoidal, a pulse-shaped, an arcuate, a helical, or any other manner, along any axis or direction, such as horizontal, vertical, or diagonal, including around housing 23.

Caps 32, 33 are coupled to opposing sides/bases of housing 23. Caps 32, 33 can be stationary with respect to housing 23. Although a portion of caps 32, 33 is hemispherical, such as dome shaped, in general, caps 32, 33 can be flat and/or rectangular and/or any other shape, such as a circle, a triangle and so forth. Each cap 32, 33 includes a bearing. Housing 23 rotates around the bearings. Cap 33 includes an opening for wire 18, which connects to power lines 11 via distribution transformer 14, a coil 20 and a plurality of connecting wires 15. The opening for wire 18 can include a grommet. Cap 32 is coupled to arm 21 via shaft 24 extending into a portion of cap 32. Cap 33 is coupled to arm 22 via shaft 30 extending into a portion of cap 33.

In another example embodiment, vertical wind turbine 100 can include a heater to generate a small amount of heat near bearings. For example, such generated heat can be used to keep the bearings from freezing. Such heater can be self-powered, such as via a battery, or powered via the generated current from turbine 100.

Figure 1B:
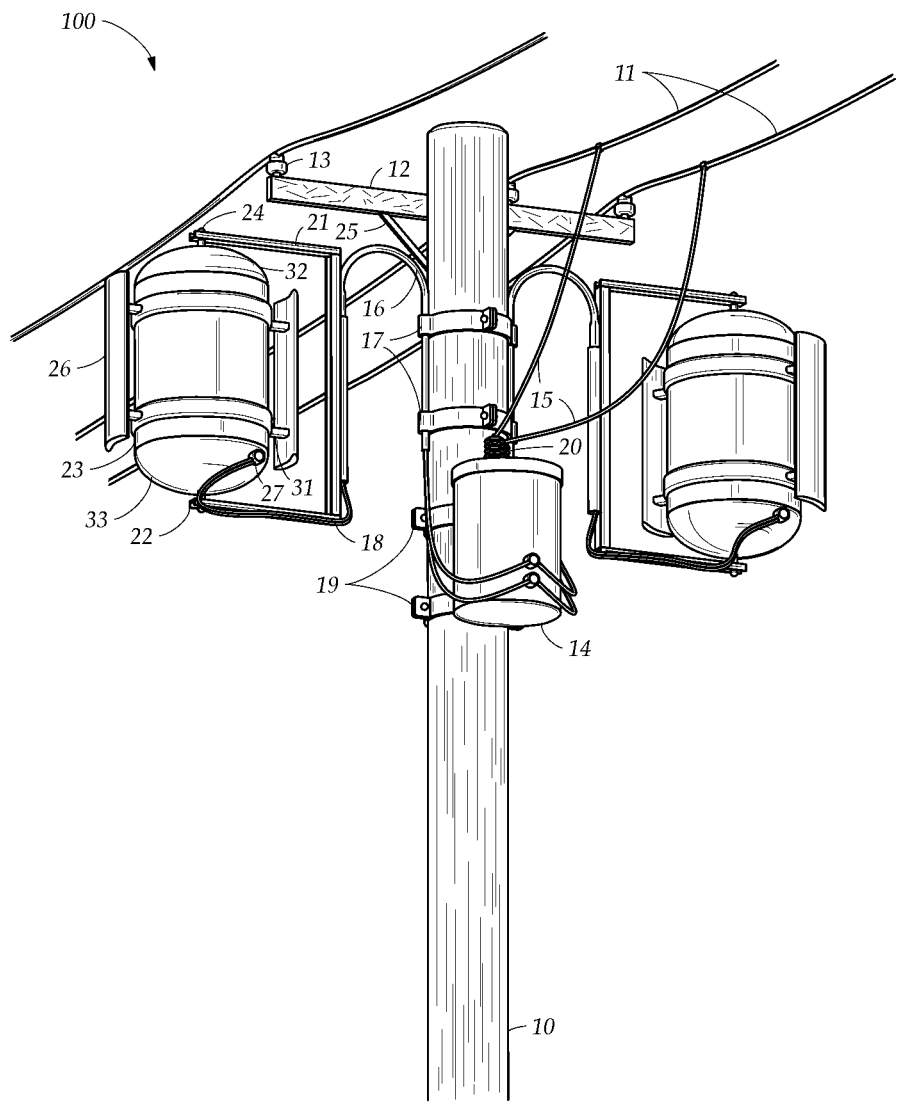
FIG. 1B illustrates another example mode of operation of a vertical axis wind turbine according to the present disclosure.

FIG. 1B illustrates another example mode of operation of a vertical axis wind turbine according to the present disclosure. Some elements of this figure are described above. Thus, same and/or similar reference characters identify same, and/or like components described above and any repetitive detailed description thereof will hereinafter be omitted or simplified in order to avoid complication.

Note that the opening for wire 18 is depicted via opening 27, which can include a grommet. Also, note that the connector for blade 26 is depicted via a connector 31, such as a bridge, like a bar, a shaft, and others. Connector 301 extends in a rectilinear manner, but can extend in a sinusoidal, a pulse-shaped, an arcuate, a helical, or any other manner, along any axis or direction, such as horizontal, vertical, or diagonal. Resultantly, blades 26 are coupled to the external surface of housing 23 via connector 31 and the band extending around the outer wall of housing 23.

A difference between FIGS. 1A and 1B is a placement of vertical axis wind turbine 100. In FIG. 1B, coupling rod 29 is coupled via bent rod 16 to utility pole 10 below power lines 11. Thus, vertical axis wind turbine is positioned below power lines 11.

In another example mode of operation, on utility pole 10, at least one vertical axis wind turbine 100 is positioned below power lines 11 and at least one vertical axis wind turbine 100 is positioned above power lines 11. For example, two opposing vertical axis wind turbines 100 can be positioned below power lines 11 and two opposing vertical axis wind turbines 100 can be positioned above power lines 11. For another example, a plurality of adjacent vertical axis wind turbines 100 can be positioned below/above power lines 11 on one side of utility pole 10 and plurality of adjacent vertical axis wind turbines 100 can be positioned below/above power lines 11 on opposing vertically extending side of utility pole 10. For yet another example, a plurality of vertical axis wind turbines 100 can be positioned on one side only. Note that any number of turbines 100 can be coupled to pole 10 in any combinatory manner.

Figure 2A:
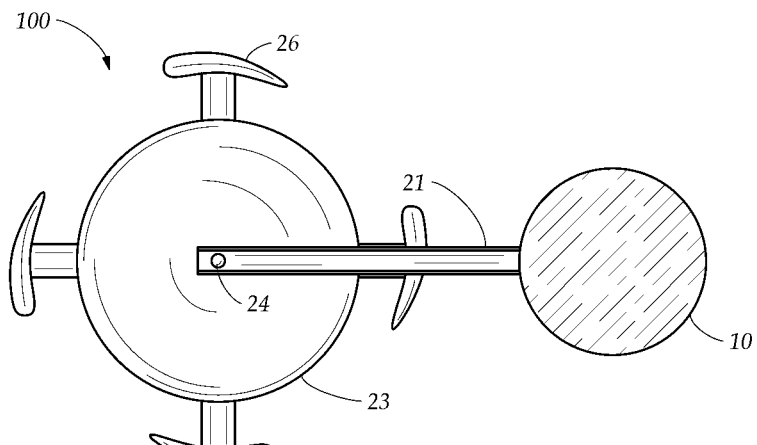
FIG. 2A and FIG. 2B illustrate a top view of an example embodiment of a vertical axis wind turbine in operation according to the present disclosure.
Figure 2B:
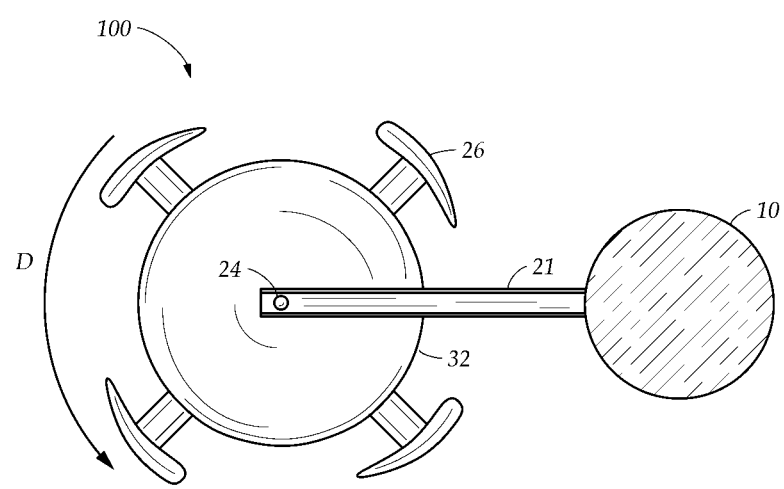

FIGS. 2A and 2B illustrate a top view of an example embodiment of a vertical axis wind turbine in operation according to the present disclosure. Some elements of this figure are described above. Thus, same and/or similar reference characters identify same, and/or like components described above and any repetitive detailed description thereof will hereinafter be omitted or simplified in order to avoid complication.

Vertical axis wind turbine 100 is coupled to utility pole 10 via cap 32, shaft 24 and arm 21. Vertical axis wind turbine 100 rotates on a vertical axis in a direction D. As vertical axis wind turbine 100 rotates, an electric current is generated by the generator stationed within housing 23. Note that blades 26 are below are 21.

Figure 3:
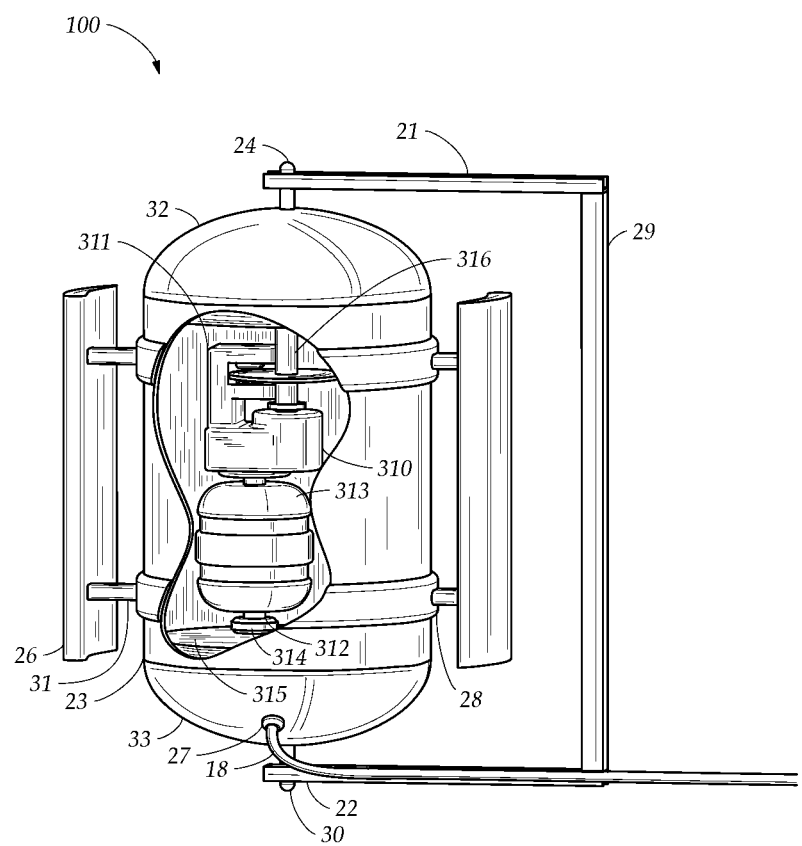
FIG. 3 illustrates an internal perspective view of an example embodiment of a vertical axis wind turbine according to the present disclosure.

FIG. 3 illustrates an internal perspective view of an example embodiment of a vertical axis wind turbine according to the present disclosure. Some elements of this figure are described above. Thus, same and/or similar reference characters identify same, and/or like components described above and any repetitive detailed description thereof will hereinafter be omitted or simplified in order to avoid complication.

Note that the band around housing 23 is depicted as a band 28, which can extend horizontally and/or diagonally in any manner. A central shaft 316 can extend from an external surface of cap 32 into a gear box 310. Although central shaft 316 can rotate at a low speed and include a plurality of shaft-to-shaft stabilizing bearings 311, in another example embodiment shaft 316 can also remain stationary. Central shaft 316 includes a first gear wheel mounted thereon. A generator 313 includes a generator shaft 312 with a second gearwheel mounted thereon, which can rotate at a high speed. The first gear wheel meshes with the second gear wheel in gear wheel box 310. Although central shaft 316 and generator shaft 312 are parallel to each other, in another example embodiment, shaft 316 and shaft 312 are not parallel to each other. Generator shaft 312 extends from a base 314 mounted on a surface 315 of cap 33 through generator 313 into gear box 310. Generator 313 can include a controller or at least one magnet. Thus, as housing 23 rotates, central shaft 316 rotates and thereby facilitates meshing of gear wheels within gear box 310, which in turn power generator 313 to generate an electric current for conduction via wire 18 to distribution transformer 14. Band 28 can rotate with respect to 313 generator and/or housing 23. Note that at least one of shaft 316 and shaft 213 can be stationary with at least one of the first gear wheel and the second gear wheel rotating. In another example embodiment, at least one of arms 21, 22, housing 23, caps 32, 33, connector 31, band 28, coupling rod 29, shafts 24, 30, bent rod 16 and blades 26 includes non-conductive material, such as porcelain or composite polymer materials.

Figure 4:
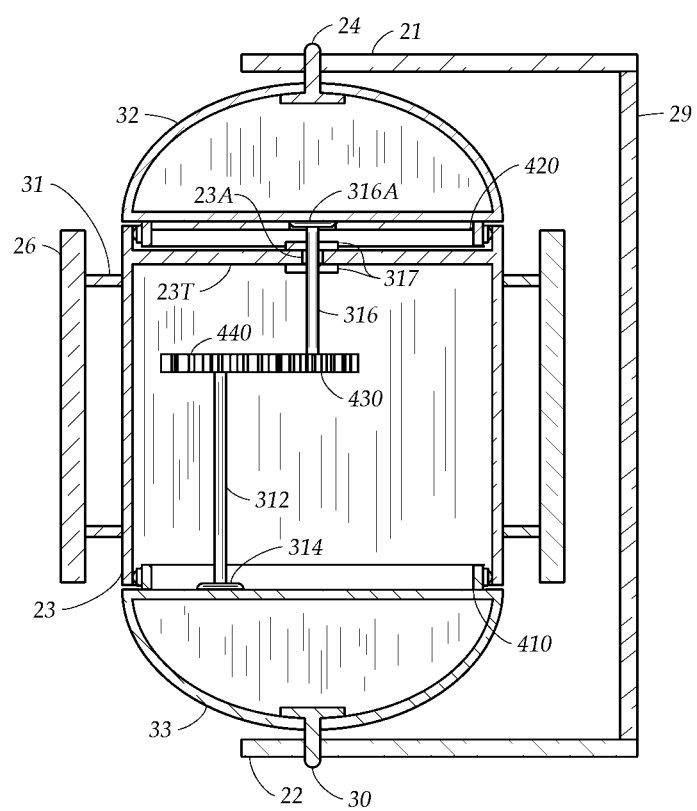
FIG. 4 illustrates a side view of an example embodiment of a vertical axis wind turbine according to the present disclosure.

FIG. 4 illustrates a side view of an example embodiment of a vertical axis wind turbine according to the present disclosure. Some elements of this figure are described above. Thus, same and/or similar reference characters identify same, and/or like components described above and any repetitive detailed description thereof will hereinafter be omitted or simplified in order to avoid complication.

Cap 32 includes a bearing 420. Cap 33 includes a bearing 410. Using bearings 410, 420, housing 23 rotates on a vertical axis. In another example embodiment, bearings 410, 420 are coupled to a heater to generate a small amount of heat near bearings 410, 420 to keep bearings 410, 420 from freezing.

Housing 23 has a housing roof 23T and a housing sidewall. Housing roof 23T is coupled to the housing sidewall. Blades 26 are secured to an external surface of the housing sidewall. Housing roof 23T has a central opening 23A through which central shaft 316 extends, but central shaft 316 is also coupled to housing roof 23T via a connection hardware 317. Central shaft 316 is stabilized by a connection to cap 32 via a shaft bearing 316A.

Central shaft 316 includes a first gear wheel 430. Generator shaft 312 includes a second gear wheel 440 meshing with first gear wheel 430 at a meshing point (MP). As central shaft 316 rotates with housing 23, first gear wheel 430 meshes with second gear wheel 440 at MP and powers generator 312. Generator shaft 312 is located in an offset position from a central axis of housing 23. As previously noted, generator 312 is secured to base 314 of cap 33 with a lower bearing, which allows axial rotation of generator shaft 312. However, note that at least a portion of shaft 312 can be co-axial to shaft 316.

In another example embodiment, by incorporating vertical wind turbine 100, as described herein, on already existing infrastructure, energy produced via turbine 100 can reduce a demand for energy from a power plant thereby efficiently creating and distributing renewable energy, decrease dependency on centralized electric energy generation, lessen fossil fuel use in electricity generation, minimize foreign energy dependence, reduce the price of electricity, create a new renewable energy business model, while implementing a job creating solution using an already existing infrastructure. Moreover, turbine 100 can produce electricity incrementally without overloading the electrical grid. Furthermore, by placing turbine 100 on top of utility poles 10, whether above or below transmission lines 11, more wind power can be captured.

Figure 5:
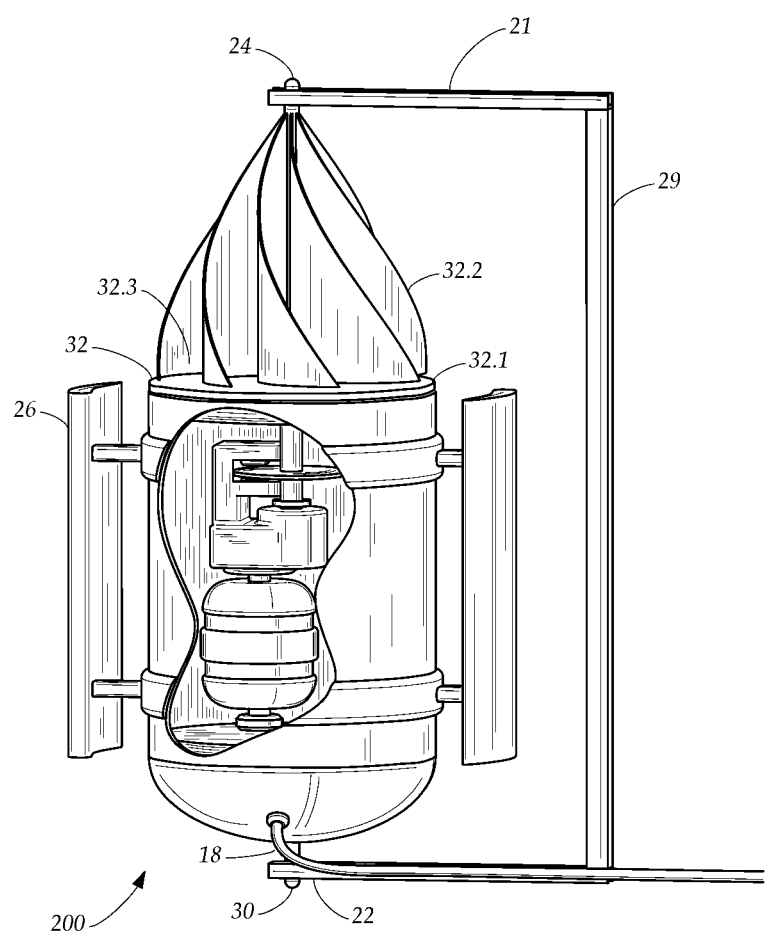
FIG. 5 illustrates a perspective view of an example embodiment of a vertical axis wind turbine having a top vertical axis wind turbine according to the present disclosure.

FIG. 5 illustrates a perspective view of an example embodiment of a vertical axis wind turbine having a top vertical axis wind turbine according to the present disclosure. Some elements of this figure are described above. Thus, same and/or similar reference characters identify same, and/or like components described above and any repetitive detailed description thereof will hereinafter be omitted or simplified in order to avoid complication.

A wind turbine 200 is coupled to arms 21, 22 via shafts 24, 30, which extend through arms 21, 22. Shafts 24, 30 can rotate, and/or be fixed with respect to arms 21, 22. Housing 23 includes a top vertical axis wind turbine 32, which replaces cap 32 as shown in FIGS. 1A-4. Turbine 32 includes a base 32.1 and a plurality of foils 32.2 having a plurality of open spaces 32.3 in-between. Note that wire 18 can extend via shaft 24. Note that turbine 32 can be coaxial with cap 33 or have different axis with respect to cap 33. Turbine 100 and turbine 200 can be co-axial.

Base 32.1 can be of any shape, such as a parallelogram, a quadrilateral, an ellipse, a triangle, a polygon, a character, a symbol, and/or others in at least one dimension. Base 32.1 includes a plurality of magnetic transformers disposed around outer perimeter of base 32.1.

Shaft 24 can be coupled to base 32.1. Shaft 24 can also remain de-coupled with base 32.1. Shaft 24 can also avoid contact with base 32.1. Shaft 24 can extend through base 32.1. Shaft 24 can also be coupled to shaft 316 for dependent wind capture. However, shaft 24 can also be de-coupled from shaft 316 for independent wind capture. Shaft 24 can be segmented. Shaft 24 can include a rotor mounted thereon, which can include a plurality of magnets disposed around outer perimeter of the rotor.

Base 32.1 can include a first magnet having a first polarity. The rotor can include a second magnet having a second polarity. The first magnet and the second magnet are positioned such that the first magnet and the second magnet are adjacent when axially aligned. The first polarity and the second polarity are such that the first magnet and the second magnet repel each other at least when installed as described herein and thereby enable levitation, such as floating and/or suspension, of the rotor above base 32.1. In any combinatory manner, the magnets can be identical to and/or different from each other in number, material, shape, size and/or any dimension, such as length, width, height, depth, area, volume, breadth, density, temperature, resistance and so forth.

Foils 32.2 extend spirally/helically about shaft 24 with spaces 32.3 in-between, while coupled to shaft 24. Foils 32.2 can extend in a rotating manner such that turbine 32 appears like an auger. Note that turbine 32 faces skyward, whether vertically or diagonally. In any combinatory manner, foils 32.2 can be identical to and/or different from each other in number, material, shape, size and/or any dimension, such as length, width, height, depth, area, volume, breadth, density, temperature, resistance and so forth. Foils 32.2 can be curved. Foils 32.2 are shaped to maximize wind energy capture irrespective of wind source, speed and/or direction. Foils 32.2 can be triangular of any type. Foils 32.2 can be linear, curvilinear and/or others. Foils 32.2 can be equally spaced apart and/or non-equally spaced apart in any manner.

The first magnet and the second magnet provide that the rotor and foils 32.2 levitate magnetically off base 32.1. Such levitation reduces friction and enhances ease of rotation, which can allow for avoiding inclusion of at least one bearing. Turbine 32 can include an axial flux alternator using variable resistance coils, which can be individually and/or selectively turned on or off depending on wind conditions and electrical draw requirements. The coils can also be used to selectively produce mechanical drag for foil braking in high wind conditions and/or for maintenance. The alternator enables efficient energy generation at low rotational speed. The magnets can be shielded from external exposure, such as weather and/or animals. The first magnet and the second magnet can be segmented. Alternatively, the first magnet refers to a plurality of first magnets and the second magnet refers to a plurality of second magnets.

Foils 32.2 can include magnets positioned at their tips. Foils 32.2 are magnetically levitated, such as via floating, above base 32.1, which can reduce friction, noise, vibration, energy loss and/or facilitate in more efficient energy generation. Alternatively, foils 32.2 are coupled to base 32.1, but base 32.1 magnetically levitates above another base. In an embodiment, housing 23 and at least one of blades 26 is a single piece, such as when connector 31 is lacking. For example, housing 23 can be structured to include a blade or a foil, such as at least one of blade 26 or at least one of foils 32.3, which extend from, along, about, or around housing 23.

The alternator includes the magnetic transformers and at least one of the magnets. In any combinatory manner, the magnetic transformers can be identical to and/or different from each other in number, material, shape, size and/or any dimension, such as length, width, height, depth, area, volume, breadth, density, temperature, resistance and so forth. The magnetic transformers can include a cored coil and/or a coreless coil. The magnets can be passive magnets. The transformers generate electricity when the magnets are rotated past the transformers. In one example embodiment, turbine 32 can transmit the generated electricity via wiring of shaft 24, such as within shaft 24, and arm 21, whether internal, external to and/or integral to arm 21. In another example embodiment, turbine 32 can transmit the generated electricity via wiring to shaft 316 to generator 313 for output via wire 18.

Turbine 32 can operate independent from blades 26 and/or depending on rotation of blades 26. Turbine 32 avoids interfering with operation of other components of turbine 200. Turbine 32 is relatively lightweight, quiet, heat/snow/ice/rain resistant and can be maintained in a minimal manner due to magnetic levitation of foils 32.2 since less or no bearings can be included.

Figure 6:
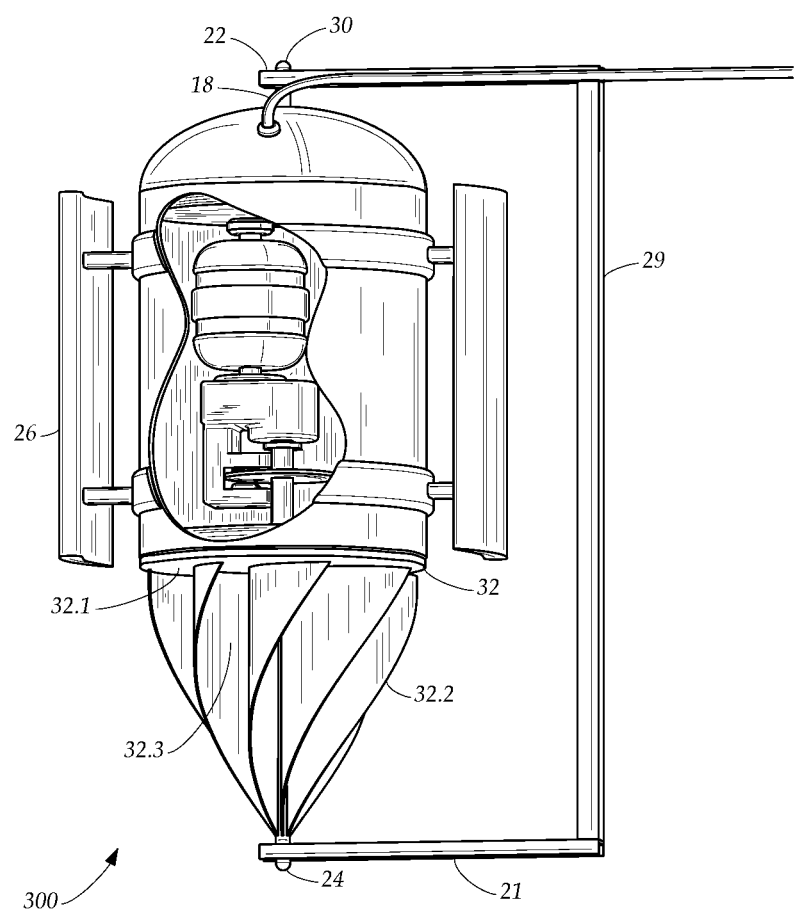
FIG. 6 illustrates a perspective view of an example embodiment of a vertical axis wind turbine having a bottom vertical axis wind turbine according to the present disclosure.

FIG. 6 illustrates a perspective view of an example embodiment of a vertical axis wind turbine having a bottom vertical axis wind turbine according to the present disclosure. Some elements of this figure are described above. Thus, same and/or similar reference characters identify same, and/or like components described above and any repetitive detailed description thereof will hereinafter be omitted or simplified in order to avoid complication.

A turbine 300 is shown. A difference between FIGS. 5 and 6 is a placement of turbine 32. In FIG. 6, turbine 32 replaces cap 33 as shown in FIGS. 1-4a. Note that turbine 32 faces earth's surface, whether vertically or diagonally. Note that wire 18 can be extending along arm 21 instead of and/or in addition to arm 22.

Figure 7:
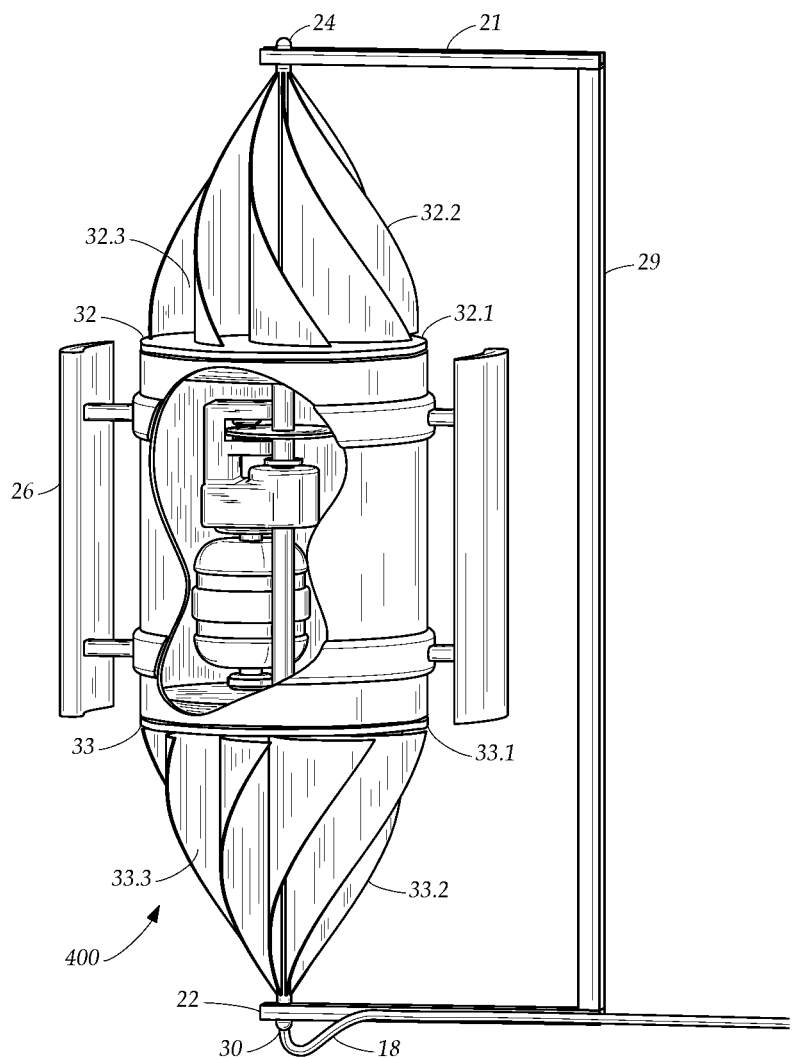
FIG. 7 illustrates a perspective view of an example embodiment of a vertical axis wind turbine having a plurality of vertical axis wind turbines according to the present disclosure.

FIG. 7 illustrates a perspective view of an example embodiment of a vertical axis wind turbine having a plurality of vertical axis wind turbines according to the present disclosure. Some elements of this figure are described above. Thus, same and/or similar reference characters identify same, and/or like components described above and any repetitive detailed description thereof will hereinafter be omitted or simplified in order to avoid complication.

A turbine 400 is shown. A difference between FIGS. 6 and 7 is a placement of turbines 32, 33. In FIG. 7, turbine 32 replaces cap 32 and turbine 33 replaces cap 33, as shown in FIGS. 1-4a. Note that turbine 32 faces skyward, whether vertically or diagonally and turbine 33 faces earth's surface, whether vertically or diagonally. Also, note that turbines 32, 33 can be coaxial to each other or have different axis with each other. Additionally, note how turbine 32 and turbine 33 can output the generated electricity. For example, turbine 32 can output via wiring of shaft 24, such as within shaft 24, and arm 21, whether internal, external to and/or integral to arm 21 and/or output the generated electricity via wiring to shaft 316 to generator 313 for output via wire 18. Wire 18 can also extend along arm 21 and be coupled to shaft 24. Similarly, turbine 33 can output via wiring of shaft 30, such as within shaft 30, and arm 22, whether internal, external to and/or integral to arm 22 and/or output the generated electricity via wiring of shaft 316.

Figure 8:
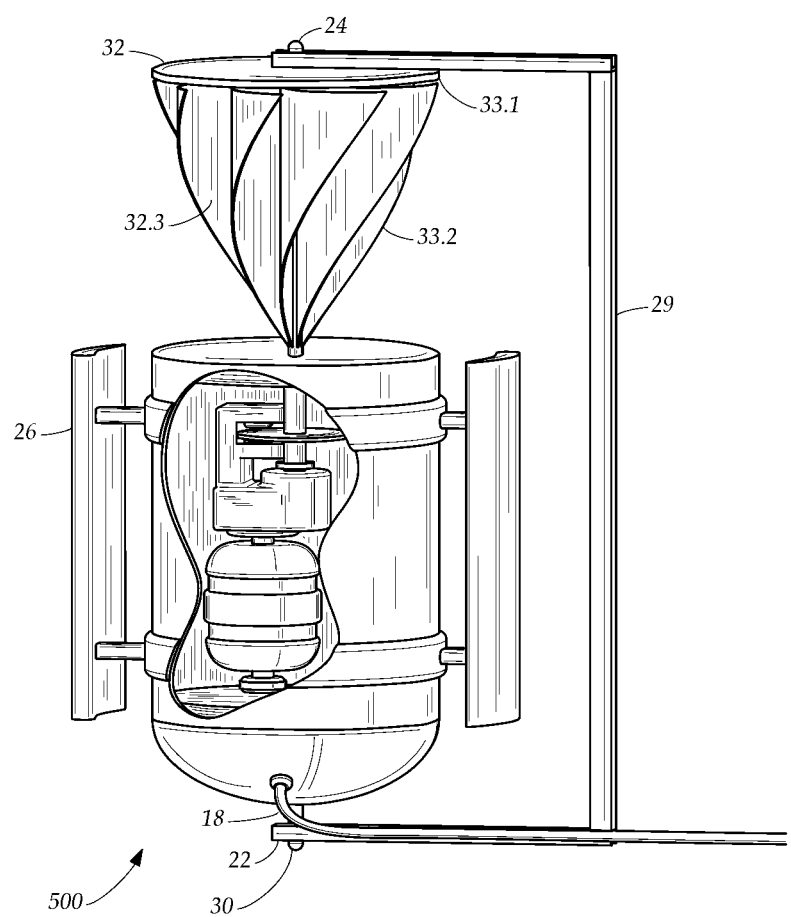
FIG. 8 illustrates a perspective view of an example embodiment of a vertical axis wind turbine having an inverted top vertical axis wind turbine according to the present disclosure.

FIG. 8 illustrates a perspective view of an example embodiment of a vertical axis wind turbine having an inverted top vertical axis wind turbine according to the present disclosure. Some elements of this figure are described above. Thus, same and/or similar reference characters identify same, and/or like components described above and any repetitive detailed description thereof will hereinafter be omitted or simplified in order to avoid complication.

A turbine 500 is shown. A difference between FIGS. 5-7 and 8 is a placement of turbine 32. In FIG. 8, turbine 32 replaces cap 32, as shown in FIGS. 1-4a. Note that turbine 32 is inverted and faces earth's surface, whether vertically or diagonally. Also, note that turbine 32 and cap 33 can be coaxial to each other or have different axis with respect to each other. Additionally, note how turbine 32 can output the generated electricity. For example, turbine 32 can output via wiring of shaft 24, such as within shaft 24 whether toward generator 312 or toward arm 21, whether internal, external to and/or integral to arm 21. Wire 18 can also extend along arm 21 and be coupled to shaft 24. Note that another turbine 32, whether facing skyward or earthward, can be coupled to shown turbine 32 such that bases 32.1 of turbines 32 at least partially overlap each other and the another turbine 32 is more proximal to arm 21 than shown turbine 32 such that the shown turbine 32 is intermediate with respect to housing 23 and the another turbine 32. Such combination can be performed with any embodiments disclosed herein in any combinatory manner.

Figure 9:
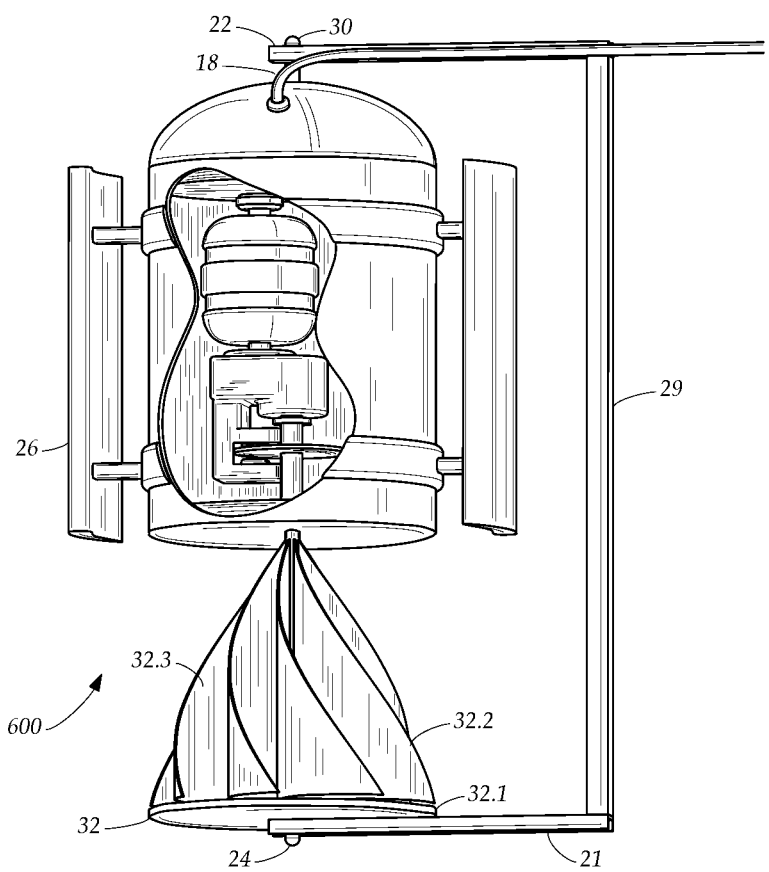
FIG. 9 illustrates a perspective view of an example embodiment of a vertical axis wind turbine having an inverted bottom vertical axis wind turbine according to the present disclosure.

FIG. 9 illustrates a perspective view of an example embodiment of a vertical axis wind turbine having an inverted bottom vertical axis wind turbine according to the present disclosure. Some elements of this figure are described above. Thus, same and/or similar reference characters identify same, and/or like components described above and any repetitive detailed description thereof will hereinafter be omitted or simplified in order to avoid complication.

A turbine 600 is shown. A difference between FIGS. 5-8 and 9 is a placement of turbine 32. In FIG. 9, turbine 32 replaces cap 32, as shown in FIGS. 1-4a. Note that turbine 32 is inverted and faces skyward, whether vertically or diagonally. Also, note that turbine 32 and cap 33 can be coaxial to each other or have different axis with respect to each other. Additionally, note how turbine 32 can output the generated electricity. For example, turbine 32 can output via wiring of shaft 24, such as within shaft 24 whether toward generator 312 or toward arm 21, whether internal, external to and/or integral to arm 21. Wire 18 can also extend along arm 21 and be coupled to shaft 24. Note that another turbine 32, whether facing skyward or earthward, can be coupled to shown turbine 32 such that bases 32.1 of turbines 32 at least partially overlap each other and the another turbine 32 is more proximal to arm 21 than shown turbine 32 such that the shown turbine 32 is intermediate with respect to housing 23 and the another turbine 32. Such combination can be performed with any embodiments disclosed herein in any combinatory manner.

Note that any number of turbines 32, 33 whether facing skyward or earthward in any combinatory manner, can be coupled to housing 23, whether above housing 23 and/or below housing 23 in any combinatory manner. For example, any number of turbines 32, 33 can be stacked one above another whether below and/or above housing 23 in any combinatory manner or positioned horizontally adjacent to each other whether below and/or above housing 23 in any combinatory manner. Also, note that any number of caps 32, 33, whether facing skyward or earthward in any combinatory manner, can be used, such as in-between turbines 32, 33. Also note any number of turbines 32, 33 can be placed in-between housing 23 and caps 32, 33, whether facing skyward or earthward in any combinatory manner.

Figure 10:
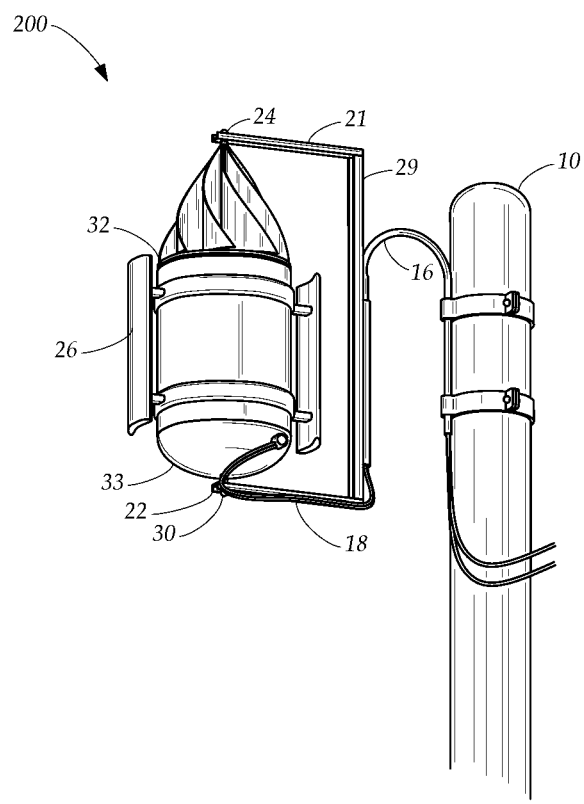
FIG. 10 illustrates a perspective view of an example embodiment of a vertical axis wind turbine having a top vertical axis wind turbine coupled to a utility pole according to the present disclosure.

FIG. 10 illustrates a perspective view of an example embodiment of a vertical axis wind turbine having a top vertical axis wind turbine coupled to a utility pole according to the present disclosure. Some elements of this figure are described above. Thus, same and/or similar reference characters identify same, and/or like components described above and any repetitive detailed description thereof will hereinafter be omitted or simplified in order to avoid complication.

Turbine 200 is coupled to pole 10 and generates electricity as described herein.

Figure 11:
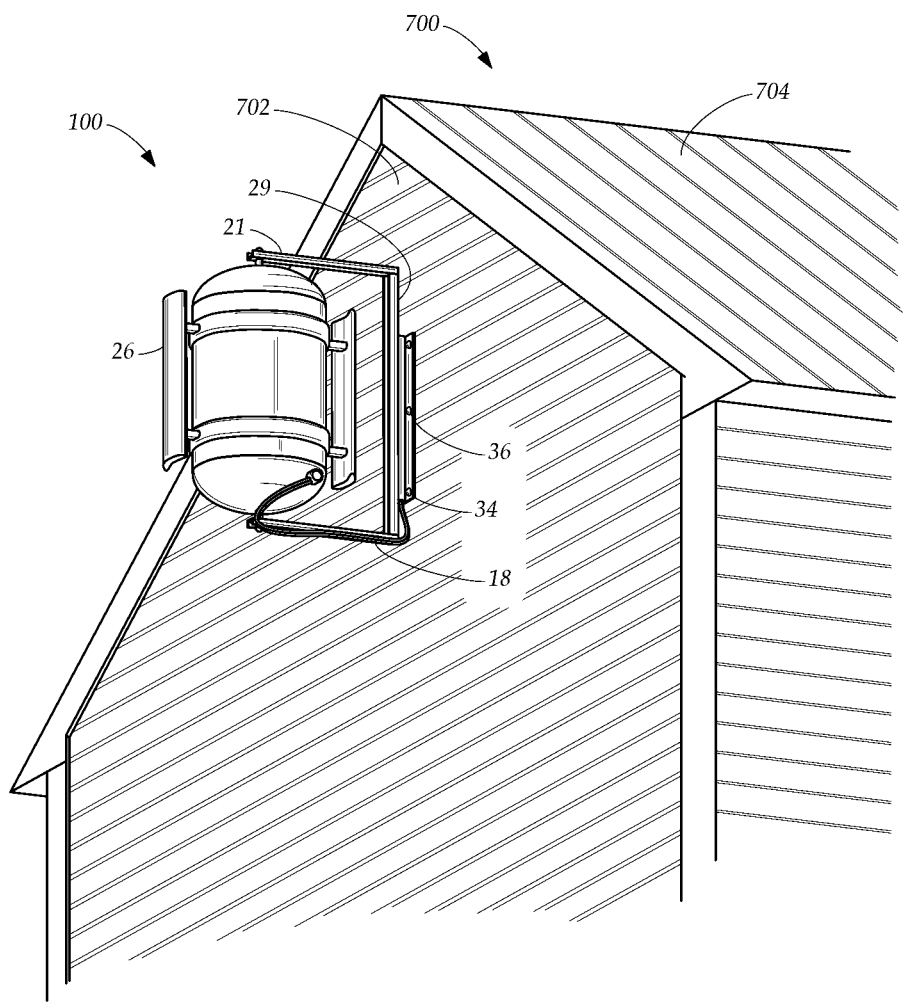
FIG. 11 illustrates an example mode of operation of a vertical axis wind turbine according to the present disclosure.

FIG. 11 illustrates an example mode of operation of a vertical axis wind turbine according to the present disclosure. Some elements of this figure are described above. Thus, same and/or similar reference characters identify same, and/or like components described above and any repetitive detailed description thereof will hereinafter be omitted or simplified in order to avoid complication.

A building 700 has a sidewall 702 and a roof 704. Turbine 100 is coupled via rod 29 to sidewall 702. Rod 29 includes and/or is coupled to a bracket 34. Bracket 34 is coupled to sidewall 702 via a plurality of fasteners 36. Note that bracket 34 and fasteners 36 accommodate for wire 18. Note that turbine 100 can also be coupled to roof 704. Note that if rain flows from roof 704, turbine 100 can still generate electricity. Note that any turbines disclosed herein can be coupled to building 700 in any combinatory manner. Note that although sidewall 702 includes vinyl siding, any type of siding can be used.

Figure 12:
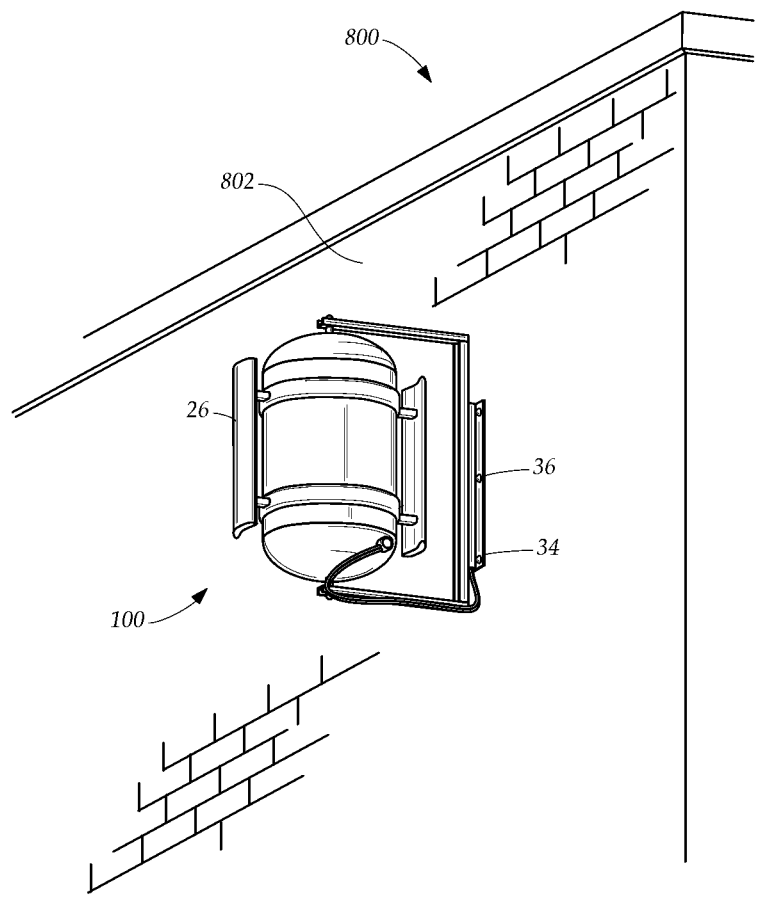
FIG. 12 illustrates an example mode of operation of a vertical axis wind turbine according to the present disclosure.

FIG. 12 illustrates an example mode of operation of a vertical axis wind turbine according to the present disclosure. Some elements of this figure are described above. Thus, same and/or similar reference characters identify same, and/or like components described above and any repetitive detailed description thereof will hereinafter be omitted or simplified in order to avoid complication.

A building 800 includes a sidewall 802. Turbine 100 is coupled to sidewall 802 via rod 29, bracket 34, and fasteners 36. Note that bracket 34 and fasteners 36 accommodate for wire 18. Note that turbine 100 can also be coupled to roof of building 800. Note that if rain flows from such roof, turbine 100 can still generate electricity. Note that any turbines disclosed herein can be coupled to building 800 in any combinatory manner. Note that although sidewall 802 includes bricks, any type of wall building material can be used.

Figure 13:
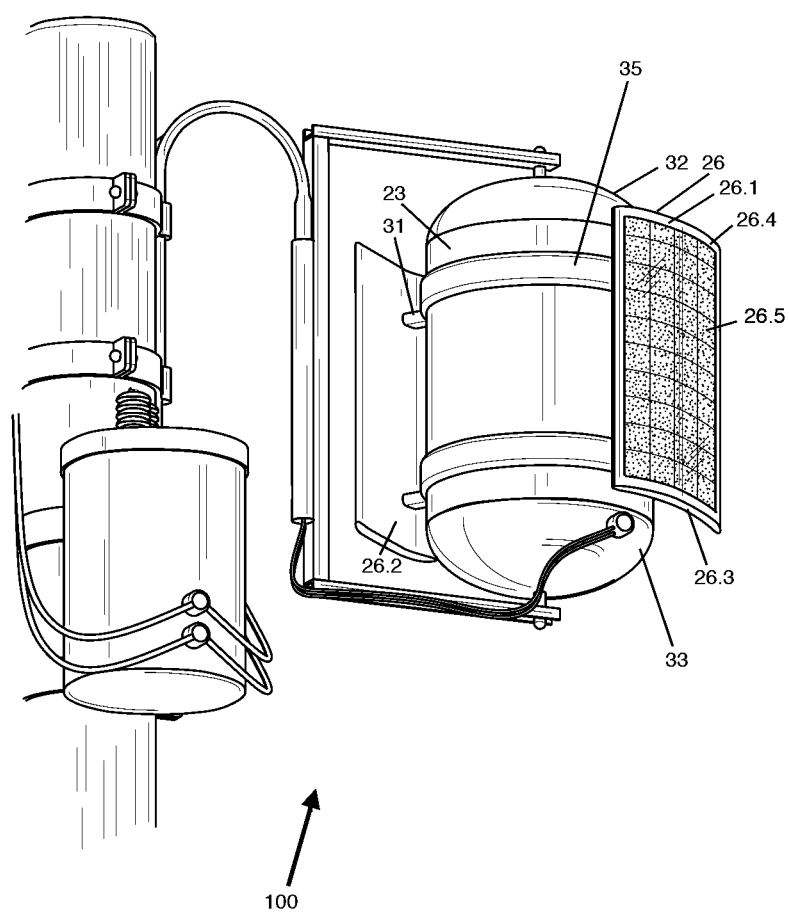
FIG. 13 illustrates a perspective view of an example embodiment of a vertical axis wind turbine equipped with a photovoltaic cell array on a blade according to the present disclosure.

FIG. 13 illustrates a perspective view of an example embodiment of a vertical axis wind turbine equipped with an array of photovoltaic cells according to the present disclosure. Some elements of this figure are described above. Thus, same and/or similar reference characters identify same, and/or like components described above and any repetitive detailed description thereof will hereinafter be omitted or simplified in order to avoid complication.

Turbine 100 includes a pair of bands 35 extending around housing 23. Bands 35 are identical to each other in any manner, such as in shape, weight, size, material, orientation, and other properties. However, in other embodiments, bands 35 are different from each other in any manner, such as shape, weight, size, material, orientation, and other properties. Bands 35 extend parallel to each other, but in other embodiments extend non-parallel to each other. Bands 35 are unitary, but in other embodiments are assemblies. Bands 35 are shaped uniformly, but in other embodiments are shaped in non-uniformly, such as for weight reduction, for example with bands 35 width narrowing between connectors 31. Bands 35 are secured to housing 23, such as through assembly with housing 23 via tension, pressure, mounting, adhesion, fastening, mating, magnetizing, and others. However, in other embodiments, bands 35 are unitary with housing 23. Resultantly, bands 35 move along with housing 23 when housing 23 rotates on a vertical axis with respect to cap 32 and cap 33. However, in other embodiments, bands 35 rotate on a vertical axis with respect to housing 23, such as when housing 23 is stationary and/or housing 23 also rotating with respect to cap 32 and cap 33. Such rotations can be clockwise and/or counterclockwise. In some embodiments, turbine 100 includes one band 35. In other embodiments, turbine 100 includes at least three bands 35. In yet other embodiments, turbine 100 lacks any bands 35, such as shown in FIG. 4.

Blades 26 are coupled to bands 35 via connectors 31. However, in other embodiments, bands 35 are lacking and blades 26 are connected to housing 23 via connectors 31, such as shown in FIG. 4. At least one of blades 26 includes an outer side 26.1, an inner side 26.2, and a set of intermediates side 26.3 spanning between side 26.1 and side 26.2, whether horizontally and/or vertically. Side 26.1 is unitary, but in other embodiments is an assembly. Side 26.2 is unitary, but in other embodiments is an assembly. Sides 26.3 are unitary, but in other embodiments are assemblies. Note that at least two of sides 26.3 are identical to each other in any manner, such as size, shape, material, orientation, weight, but can be different from each other, such as size, shape, material, orientation, weight.

Side 26.1 includes an array 26.4 of photovoltaic cells 26.5, such as solar cells. Array 26.4 is rectangular, but in other embodiments, array 26.4 is square. Note that at least two arrays 26.4 are also possible, which can be identical to and/or different from each other in any manner. Further, note that array 26.4 is curved and projects away from housing 23. However, in other embodiments, array 26.4 is non-curved. Array 26.4 is embedded into blade 26. However, in other embodiments, array 26.4 is securely stationed on blade 26, such as via tension, pressure, mounting, adhesion, fastening, mating, magnetizing, and others.

Cells 26.5 are identical to each other in any manner, such as in size, shape, material, orientation, weight, electricity generation, and others, but can be different from each other in any manner, such as size, shape, material, orientation, weight, electricity generation, and others. Cells 26.5 are operative to receive light energy and convert the received light energy into electricity, such as electric current, via a photovoltaic effect. For example, the light energy is via at least one of solar energy, lunar energy, street lamppost energy, vehicle lamp energy, and flashlight energy. The electricity is guided from array 26.4 via electrically conductive wiring/contacts/hardware, such as cables, inverters, and others, operably extending through one of blades 26, at least one of connectors 31, housing 23, and cap 33, to wire 18. Therefore, turbine 100 generates electricity in at least one of a mechanical manner, such as via rotating of blades 26 via wind energy, and a photovoltaic manner, such as via array 26.4 through light energy. Such capability can improve electricity generation, such as during windy conditions on a sunny day when turbine 100 can generate electricity in the mechanical manner and the photovoltaic manner simultaneously.

Note that at least one of blades 26 can include at least one cell 26.5 anywhere thereon. For example, side 26.2 can include at least one cell 26.5 and/or at least one of sides 26.3 can include at least one cell 26.5. In still other embodiments, at least one of connectors 31 includes at least one cell 26.5. In further embodiments, at least one of bands 35 includes at least one cell 26.5. In yet other embodiments, housing 23 includes at least one cell 26.5. Such inclusion can be between bands 35, and/or between caps 32, 33 and bands 35. Cell 26.5 can be shaped in any way and/or arranged with other cells 26.5 in any manner. In yet still other embodiments, at least one of cap 32 and cap 33 includes at least one cell 26.5. Such inclusion allows for cell 26. to be shaped in any way and/or arranged with other cells 26.5 in any manner.

FIG. 14A illustrates a frontal view of an example embodiment of a photovoltaic cell on a vertical axis wind turbine blade according to the present disclosure. Some elements of this figure are described above. Thus, same and/or similar reference characters identify same, and/or like components described above and any repetitive detailed description thereof will hereinafter be omitted or simplified in order to avoid complication.

Blade 26 includes cell 26.5, which is shaped as a rectangle. However, note that in other embodiments, cell 26.5 is shaped differently, such as a triangle, an oval, a square, a trapezoid, a pentagon, an octagon, and others. Note that blade 26 can be shaped differently as well, such as a square, a circle, a triangle, a pentagon, an octagon, a trapezoid, and others.

FIG. 14B illustrates a frontal view of an example embodiment of a photovoltaic cell array on a vertical axis wind turbine blade according to the present disclosure. Some elements of this figure are described above. Thus, same and/or similar reference characters identify same, and/or like components described above and any repetitive detailed description thereof will hereinafter be omitted or simplified in order to avoid complication.

Blade 26 includes array 26.4 containing cells 26.5. Note that corner cells 26.5 are curved, but in other embodiments, the corner cells 26.5 are acute. Further, note that non-corner cells 26.5. are square shaped, but in other embodiments, non-corner cells 26.5 are shaped differently, such as a triangle, an oval, a rectangle, a trapezoid, a pentagon, an octagon, and others.

FIG. 14C illustrates a frontal view of another example embodiment of a photovoltaic cell array on a vertical axis wind turbine blade according to the present disclosure. Some elements of this figure are described above. Thus, same and/or similar reference characters identify same, and/or like components described above and any repetitive detailed description thereof will hereinafter be omitted or simplified in order to avoid complication.

Blade 26 includes array 26.4 containing cells 26.5. Note that cells 26.5 are circular, but in other embodiments, are shaped differently, such as a triangle, an oval, a rectangle, a square, a trapezoid, a pentagon, an octagon, and others. Note that empty spaces between cells 26.5 provide at least visual access to side 26.1 of blade 26. However, also note that in other embodiments, blade 26 is defined via array 26.4. For example, the empty spaces provide at least visual access to housing 23.

FIG. 14D illustrates a frontal view of an example embodiment of a photovoltaic cell enclosed via a set of photovoltaic cells arranged in a rectangular pattern on a vertical axis wind turbine blade according to the present disclosure. Some elements of this figure are described above. Thus, same and/or similar reference characters identify same, and/or like components described above and any repetitive detailed description thereof will hereinafter be omitted or simplified in order to avoid complication.

Cell 26.5 is enclosed via a set of cells 26.5 arranged in a rectangular pattern. However, note that the set of cells 26.5 is arranged in another pattern, such as a square, an ellipse, a pentagon, an octagon, a triangle, and others.

FIG. 14E illustrates a frontal view of an example embodiment of a set of photovoltaic cells arranged in a numerically alternating pattern on a vertical axis wind turbine blade according to the present disclosure. Some elements of this figure are described above. Thus, same and/or similar reference characters identify same, and/or like components described above and any repetitive detailed description thereof will hereinafter be omitted or simplified in order to avoid complication.

The set of cells 26.5 is arranged in a numerically alternating pattern. Note that such number can alternate in any manner. Each of cells 26.5 is circular, but can be shaped differently, such as described herein.

FIG. 14F illustrates a frontal view of another example embodiment of a set of photovoltaic cells arranged in a numerically alternating pattern on a vertical axis wind turbine blade according to the present disclosure. Some elements of this figure are described above. Thus, same and/or similar reference characters identify same, and/or like components described above and any repetitive detailed description thereof will hereinafter be omitted or simplified in order to avoid complication.

The set of cells 26.5 is arranged in a numerically alternating pattern. Note that such number can alternate in any manner. Each of cells 26.5 is square, but can be shaped differently, such as described herein.

Although FIGS. 14A-14F are described with reference to blade 26, note that, in other embodiments, any one of such configurations and/or combinations thereof are used on at least one of other elements of turbine 100, such as at least one of at least one connector 31, at least one blade 35, housing 23, cap 32 and cap 33. Note that other portions of setup described herein can also include at least one cell 26.5, such as arms 21.

Figure 15A:
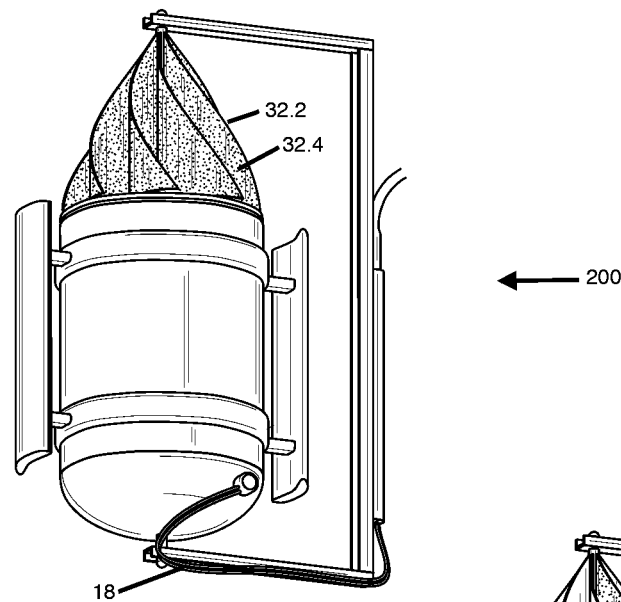
FIG. 15A illustrates a perspective view of an example embodiment of a first vertical axis wind turbine coupled to a second vertical axis wind turbine with a plurality of sequential photovoltaic foils according to the present disclosure.

FIG. 15A illustrates a perspective view of an example embodiment of a first vertical axis wind turbine coupled to a second vertical axis wind turbine with a plurality of sequential photovoltaic foils according to the present disclosure. Some elements of this figure are described above. Thus, same and/or similar reference characters identify same, and/or like components described above and any repetitive detailed description thereof will hereinafter be omitted or simplified in order to avoid complication.

Turbine 200 includes foils 32.2. Each of foils 32.2 includes at least one photovoltaic cell 32.4, as described herein. Note that cells 32.4 are identical to each other in any manner, such as in size, shape, material, orientation, weight, electricity generation, and others, but can be different from each other in any manner, such as size, shape, material, orientation, weight, electricity generation, and others. Cells 32.4 are operative to receive light energy and convert the received light energy into electricity, such as electric current, via a photovoltaic effect. For example, the light energy is via at least one of solar energy, lunar energy, street lamppost energy, vehicle lamp energy, and flashlight energy. The electricity is guided from cells 32.4 via electrically conductive wiring/contacts/hardware, such as cables, inverters, and others, operably extending through foils 32.2, housing 23, and cap 33, to wire 18. Therefore, turbine 200 generates electricity in at least one of a mechanical manner, such as via rotating of at least one of blades 26 and foils 32.2 via wind energy, and a photovoltaic manner, such as via cells 32.4 through light energy. Such capability can improve electricity generation, such as during windy conditions on a sunny day when turbine 200 can generate electricity in the mechanical manner and the photovoltaic manner simultaneously. Note that at least one of foils 32.2 can include at least one cell 32.4 anywhere thereon in any pattern, such as located on a single side of one of foils 32.2, both sides of one of foils 32.2, and others.

Figure 15B:
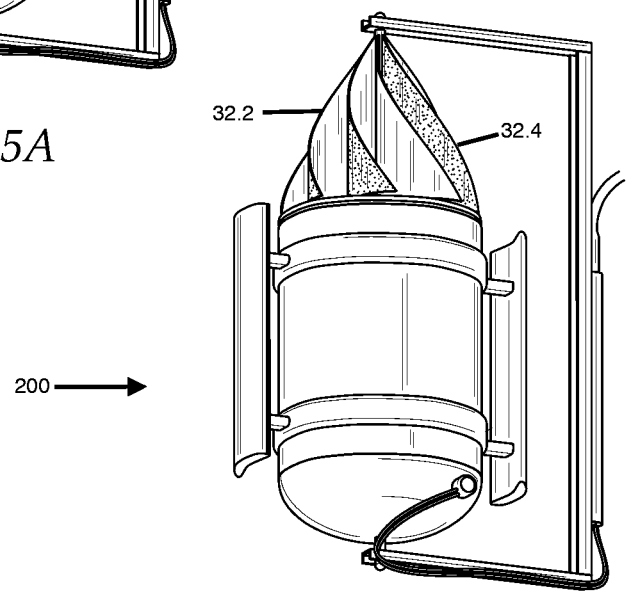
FIG. 15B illustrates a perspective view of an example embodiment of a first vertical axis wind turbine coupled to a second vertical axis wind turbine with a plurality of alternating photovoltaic foils according to the present disclosure.

FIG. 15B illustrates a perspective view of an example embodiment of a first vertical axis wind turbine coupled to a second vertical axis wind turbine with a plurality of alternating photovoltaic foils according to the present disclosure. Some elements of this figure are described above. Thus, same and/or similar reference characters identify same, and/or like components described above and any repetitive detailed description thereof will hereinafter be omitted or simplified in order to avoid complication.

Turbine 200 includes foils 32.2. Less than each of foils 32.2 includes at least one photovoltaic cell 32.4. As shown, a placement of cells 32.4 alternates between foils 32.2. Note that such alternation is one example and other types of alternation/patterns are possible, such as every other two foils 32.2. Note that cells 32.4 are identical to each other in any manner, such as size, shape, material, orientation, weight, electricity generation, and others, but can be different from each other in any manner, such as size, shape, material, orientation, weight, electricity generation, and others.

Figure 16:
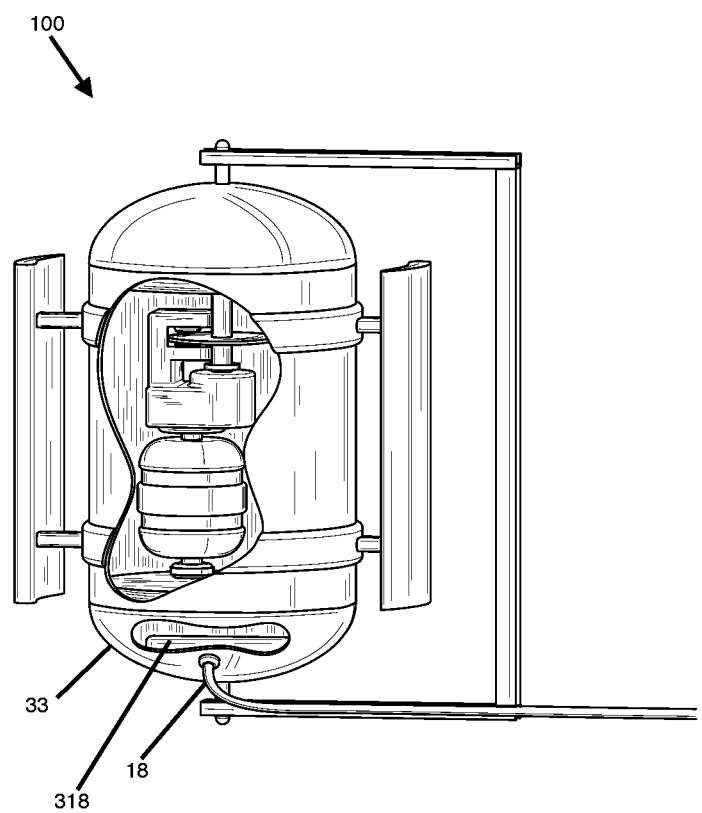
FIG. 16 illustrates a perspective of an example embodiment of a vertical axis wind turbine containing a power storage device for storing generated energy according to the present disclosure.

FIG. 16 illustrates a perspective of an example embodiment of a vertical axis wind turbine containing a power storage device for storing generated energy according to the present disclosure. Some elements of this figure are described above. Thus, same and/or similar reference characters identify same, and/or like components described above and any repetitive detailed description thereof will hereinafter be omitted or simplified in order to avoid complication.

Cap 33 contains a power storage device, such as a rechargeable battery 318. However, note that in other embodiments, the power storage device can be located in other portions of turbine 100, such as cap 32, housing 23, and others. Also, note that in other embodiments, the power storage device includes a capacitor.

Battery 318, such as a lead-acid battery, a nickel cadmium (NiCd) battery, a nickel metal hydride (NiMH) battery, a lithium ion (Li-ion) battery, a lithium ion polymer (Li-ion polymer) battery, and others. Battery 318 is configured for storage of electrical energy, as generated via at least one of the mechanical manner, such as via at least one of blades 26 and foils 32.2, and the photovoltaic manner, such as via at least one cells 26.5 and cells 32.4. Housing 23 contains an inverter, which can also be located in other portions of turbine 100. Battery 318 is operably downstream from the inverter. Battery 318 is operably connected to wire 18.

When turbine 100 is stationed on a lamppost, then battery 318 can be configured to provide power for nighttime lighting of the lamppost. Further, when turbine 100 is placed on a utility pole, then battery 318 can be configured to provide power for nighttime lighting of the pole. In addition, other types of lighting can be powered via battery 318, such as traffic lights, aircraft warning lights, and others. However, note that battery 318 can also, whether additionally or alternatively, provide power to other electrical equipment operably coupled with or comprised in turbine 100, such as a residential/commercial/industrial lighting unit, a cellular base station, a radar unit, a camera unit, and others. For example, any element of turbine 100 can comprise an antenna, a light source, or an image capture device. Such power provision is at least one of manual or automatic. Also, note that battery 318 can be provide power to the heater, as described herein.

Figure 17A:
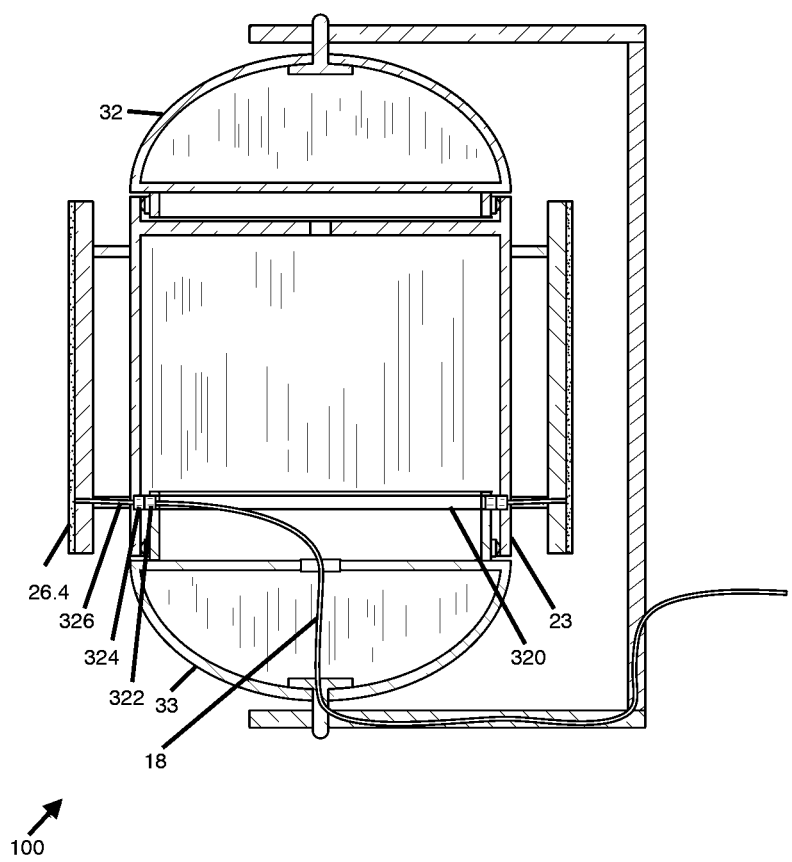
FIG. 17A illustrates a schematic view of an example embodiment of a photovoltaic current conduction system according to the present disclosure.

FIG. 17A illustrates a schematic view of an example embodiment of a photovoltaic current conduction system according to the present disclosure. Some elements of this figure are described above. Thus, same and/or similar reference characters identify same, and/or like components described above and any repetitive detailed description thereof will hereinafter be omitted or simplified in order to avoid complication.

Turbine 100 includes a plate 320 housed within housing 23. Plate 320 is circularly ring shaped to accommodate for positioning of generator 313, as shown in FIG. 3. However, in other embodiments, plate 320 is shaped differently, such as a flat and solid surface. Plate 320 contains a peripheral outer edge equipped with a first electrode 322, which extends circularly along the edge. Electrode 322 is electrically connected to wire 18, whether directly and/or indirectly. Note that other relevant electrical equipment can be electrically connected to wire 18 downstream from electrode 322 prior to wire 18 exiting cap 33. Note that in other embodiments, plate 320 is lacking and electrode 322 is ring shaped.

Housing 23 contains a second electrode 324 extending from and/or within the housing sidewall. Turbine 100 includes a bridging wire 326 electrically connected to array 26.4 and electrode 324. Note that other relevant electrical equipment, such as an inverter, can be electrically connected to wire 326 upstream to electrode 326 and downstream from array 26.4. Electrode 324 conductively contacts electrode 326.

As array 26.4 receives light energy, while at least one of blade 26 and housing 23 rotate with respect to cap 32 and cap 33, electric current is conducted from array 26.4 via wire 326, electrode 324, and electrode 322 to wire 18, as electrode 324 circularly travels about electrode 322 and contacts electrode 322. Additionally, note that battery 318 can be operably connected to wire 18. Note that turbine 100, as other turbines disclosed herein, is configured to minimize risk of electric fire, sparks, and other dangers during electric current conduction. In addition, note that electrode 324 and electrode 322 are configured for smooth electrical contact therebetween. Such smooth contact can minimize friction between electrode 324 and electrode 322 and maximize rotation of at least one of blade 26 and housing 23. Note that electrode 324 can be wheeled.

Figure 17B:
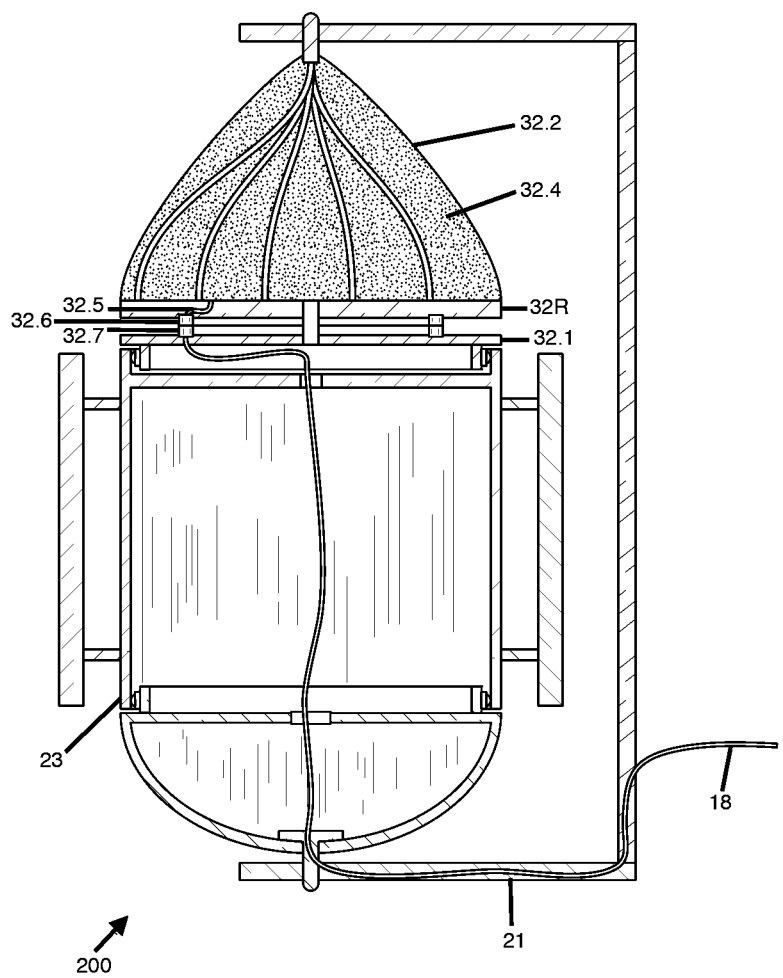
FIG. 17B illustrates a schematic view of another example embodiment of a photovoltaic current conduction system according to the present disclosure.

FIG. 17B illustrates a schematic view of another example embodiment of a photovoltaic current conduction system according to the present disclosure. Some elements of this figure are described above. Thus, same and/or similar reference characters identify same, and/or like components described above and any repetitive detailed description thereof will hereinafter be omitted or simplified in order to avoid complication.

Turbine 200 includes base 32.1 and a rotor 32R. Rotor 32R contains foils 32.2 equipped with cells 32.4. Via wind energy, rotor 32R rotates with respect to base 32.1 on a vertical axis based at least in part on magnetic levitation, as disclosed herein. Rotor 32R contains a bridging wire 32.5 having a first contact, which can be an end contact, and a second contact, which can be an end contact. The first contact is configured for receiving current generated via cells 32.4. The second contact includes a first electrode 32.6. Note that rotor 32R can contain other relevant electrical equipment, such as an inverter, electrically connected to wire 32.5 downstream from cells 32.4 and upstream from electrode 32.6.

Base 32.1 includes a second electrode 32.7 electrically connected to wire 18, whether directly and/or indirectly. Electrode 32.7 is circular to accommodate for rotation of electrode 32.6 via rotor 32R. However, in other embodiments, electrode 32.7 is shaped differently, such as a crescent. Note that other relevant electric equipment can be electrically connected to wire 18 downstream from electrode 32.7 and upstream prior to wire 18 exiting arm 21.

As cells 32.4 receive light energy, while rotor 32R rotates with respect to base 32.1, electric current is conducted from cells 32.4 via wire 32.5, electrode 32.6, and electrode 32.7 to wire 18, as electrode 32.6 circularly travels about electrode 32.7 and contacts electrode 32.7. Note that battery 318 can be operably connected to wire 18. Further, note that turbine 200, as other turbines disclosed herein, is configured to minimize risk of electric fire, sparks, and other dangers during electric current conduction. In addition, note that electrode 32.6 and electrode 32.7 are configured for smooth electrical contact therebetween. Such smooth contact can minimize friction between electrode 32.6 and electrode 32.7 and maximize rotation of rotor 32R with respect to base 32.1. Note that electrode 32.6 can be wheeled.

Figure 17C:
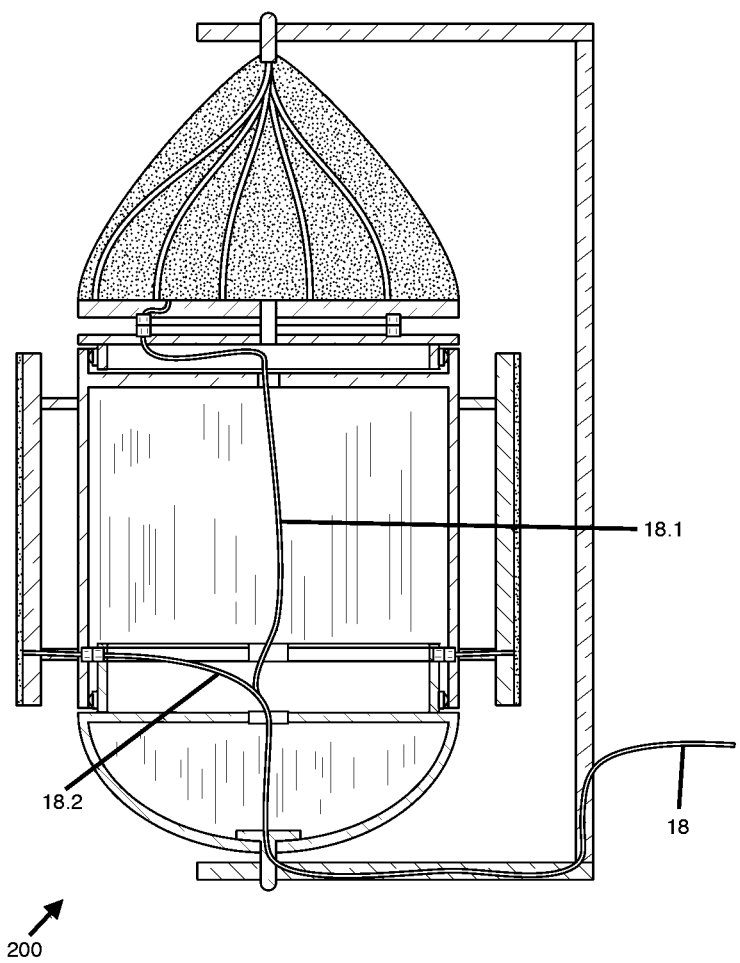
FIG. 17C illustrates a schematic view of yet another example embodiment of a photovoltaic current conduction system according to the present disclosure.

FIG. 17C illustrates a schematic view of yet another example embodiment of a photovoltaic current conduction system according to the present disclosure. Some elements of this figure are described above. Thus, same and/or similar reference characters identify same, and/or like components described above and any repetitive detailed description thereof will hereinafter be omitted or simplified in order to avoid complication.

Turbine 200 illustrates system of FIG. 17A and FIG. 17B. Wire 18 includes a wire 18.1 and a wire 18.2. Wire 18.1 is electrically connected to electrode 32.7, which receives electric current from electrode 32.6, and wire 32.5, as generated via cells 32.4. Wire 18.2 is electrically connected to electrode 322, which receives electric current from electrode 324 and wire 326, as generated via cells 26.4.

Figure 18:
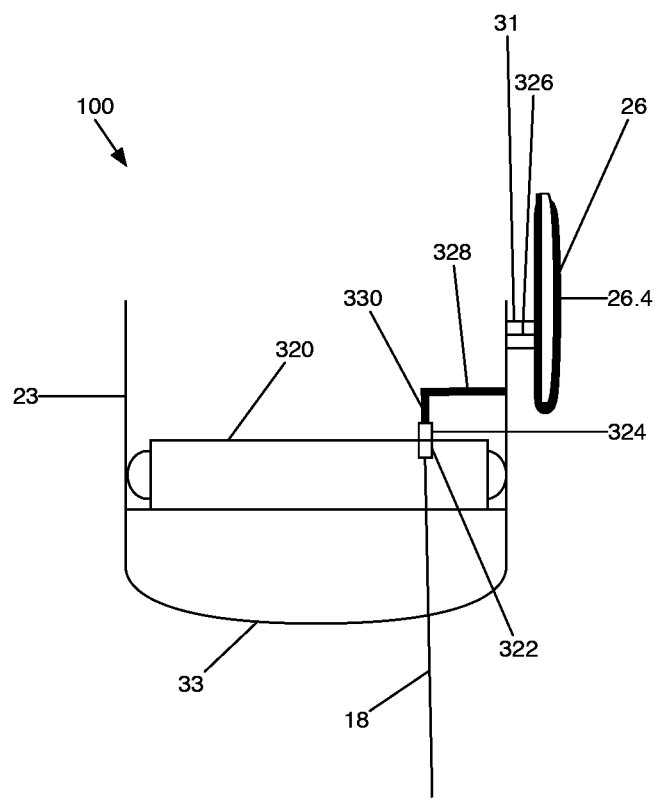
FIG. 18 illustrates a schematic view of still another example embodiment of a photovoltaic current conduction system according to the present disclosure.

FIG. 18 illustrates a schematic view of still another example embodiment of a photovoltaic current conduction system according to the present disclosure. Some elements of this figure are described above. Thus, same and/or similar reference characters identify same, and/or like components described above and any repetitive detailed description thereof will hereinafter be omitted or simplified in order to avoid complication.

Turbine 100 includes an arm 328 and a leg 330. Arm 328 and leg 330 extend from each other an L-shaped manner. However, note that arm 328 and leg 330 can extend from each other in a non-L-shaped manner as well, such as in a first range between about 90 degrees and about 170 degrees, a second range between about 20 degrees and about 90 degrees, and others. Arm 328 and leg 330 are unitary to each other, but in other embodiments are assembled to each other. Arm 328 and leg 330 are housed within housing 23. Leg 330 includes electrode 324. Plate 320 includes electrode 322, which is circularly shaped. Arm 328 is fixedly coupled to the housing sidewall in an L-shaped manner. However, other coupling orientations are possible, such as at a larger angle from leg 330, for example about 130 degrees from leg 330. Arm 328 and leg 330 host wiring, which electrically connects electrode 324 to cells 26.4 on blade 26. Such wiring is operably connected to wire 326 extending along connector 31. Also, note that such wiring extends through the housing sidewall between arm 328 and wire 326.

As array 26.4 receives light energy, while at least one of blade 26 and housing 23, along with arm 328, leg 330, and electrode 324, rotate with respect to cap 33, electric current is conducted from array 26.4 via wire 326, through the wiring in the housing sidewall, along arm 328, leg 330, electrode 324, and electrode 322 to wire 18, as electrode 324 circularly travels about electrode 322 and contacts electrode 322. Note that other relevant electrical equipment, such as an inverter, can be electrically connected to and/or along at least one of the wiring in the sidewall, wire 326, arm 328, and leg 330.

Figure 19:
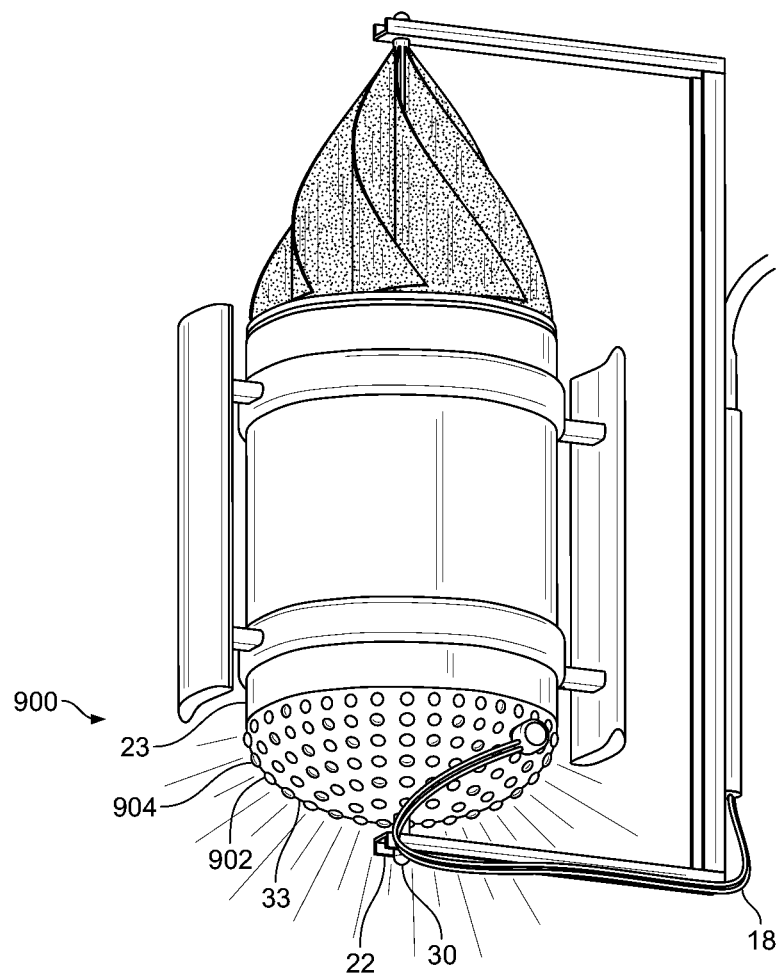
FIG. 19 illustrates a perspective view of an example embodiment of a vertical axis wind turbine with a light source according to the present disclosure.

FIG. 19 illustrates a perspective view of an example embodiment of a vertical axis wind turbine with a light source according to the present disclosure. Some elements of this figure are described above. Thus, same and/or similar reference characters identify same, and/or like components described above and any repetitive detailed description thereof will hereinafter be omitted or simplified in order to avoid complication.

Among other parts, as described herein, a vertical axis wind turbine 900 comprises wire 18, arm 22, housing 23, shaft 30, cap 33, and at least one opening 902 or at least one light source 904. If more than one light source 904 is included, then light sources 904 can be identical to or different from each other in any manner, aspect, or characteristic, such as structure, function, operation, material, luminosity, intensity, energy efficiency, color, installation, activation/deactivation, power supply, direction, or any other feature. For example, the light source 904 can include at least one of an incandescent bulb, a light emitting diode (LED), a fluorescent bulb, a plasma bulb, or a laser bulb, but can also, whether additionally or alternatively, include at least one of a bioluminescent light source, an incandescent light source, a radioluminescenct light source, a phosphorescent light source, a triboluminescenct light source, a nuclear light source, a chemoluminescenct light source, an electric light source, a laser light source, a gas light source, a combustion light source, a high-intensity discharge light source, or any other light source type, whether alone or in any combination. For example, at least one light source 904 can output a light of at least one of a white, yellow, red, green, or blue color, or any combinations thereof, in any timing manner, such as alternating, blinking, varying, uniform, or consistent.

Cap 33 defines openings 902 therein. Although openings 902 can be identical to each other in at least one of shape, depth, diameter, or size, openings 902 can also differ from each other in at least one of shape, depth, diameter, or size. For example, at least one of openings 902 can be circular, oval, polygonal, triangular, square, rectangular, pentagonal, octagonal, star shape, mammal shape, or any other shape, whether open or closed, whether solid or segmented. Also for example, at least one of openings 902 can be longitudinal or lateral, similar to a geographic longitude or a geographic latitude. For example, at least two of openings 902 can intersect or a grid can be formed.

Openings 902 and light sources 904 can correspond in any manner of correspondence, such as one-to-one, one-to-many, many-to-one, or many-to-many. For example, as shown in FIG. 19, at least two of openings 902 corresponds to at least two of light sources 904. However, in other embodiments, at least two of openings 902 correspond to a single light source 904 or vice versa, such as a single opening 902 corresponds to at least two light sources 904. Also alternatively, cap 33 can lack any openings 902 and cap 33 can comprise at least one light source 904, such as via the at least one light source 904 be disposed thereon or therein or the at least one light source 904 being enclosed by cap 33. Note that cap 33 can be at least one of opaque, translucent, reflective, or transparent. Further, note that cap 32 can also comprise a light source, whether additionally or alternatively, whether as cap 33 or in a different manner, whether such light source is identical to light source 902 or structured/functions in a different manner. Additionally, note that any other parts of turbine 900 or other turbines described herein or surfaces/structures onto which any of turbines disclosed herein can couple/install/mount can comprise or be a light source, whether such light source is identical to light source 902 or installed/structured/functions in a different manner. For example, at least a portion of at least one of power lines 11, at least one of connecting wires 15, wire 18, arm 22, rod 16, housing 23, shaft 30, at least one of blades 26, at least one connector 31, at least one of foils 32.2, rod 29, pole 10, or any other structural element disclosed herein, whether internal or external, whether visible from outside or from inside, can be at least partially phosphorescent.

When cap 33 contains the power storage device, such as rechargeable battery 318, the power storage device can power light source 904. However, in other embodiments, the power storage device can be located in other portions of any turbines disclosed herein. In an embodiment, light source 904 can be powered via at least one of at least one of power lines 11, at least one of connecting wires 15, or wire 18. In an embodiment, light source device 904 can be powered via generator 313 or any other generator coupled thereto, whether local to or remote from light source 904. In an embodiment, light source 904 can be powered in a photovoltaic manner, as described herein. In an embodiment, light source 904 can be powered via any renewable energy source coupled thereto, such as wind, water, or photovoltaic, or any fossil fuel, whether as part of any turbines disclosed herein or separate therefrom, whether locally or remotely.

The present disclosure has been presented for purposes of illustration and description via example, but is not intended to be exhaustive or limited to the disclosure in the form disclosed. Many modifications and variations in techniques and structures are apparent to those of ordinary skill in the art without departing from the scope and spirit of the disclosure as set forth in the claims that follow. Accordingly, such modifications and variations are contemplated as being a part of the present disclosure. The scope of the present disclosure is defined by the claims, which includes known equivalents and unforeseeable equivalents at the time of filing of this application.

The invention claimed is:

1. A device comprising:
 a vertical axis wind turbine comprising:
  an arm that is cantilevered;
  a housing coupled to the arm;
  a generator housed within the housing; and
  a blade extending along the housing vertically, wherein the blade is propellable via a wind with respect to the arm about a vertical axis such that the arm is stationary with respect to the blade, wherein the arm is non-vertical with respect to the vertical axis.

2. The device of claim 1, wherein the vertical axis wind turbine comprises a bar spanning between the blade and the housing.

3. The device of claim 2, wherein the bar is a first bar, wherein the vertical axis wind turbine comprises a second bar spanning between the blade and the housing.

4. The device of claim 1, wherein the blade is a first blade, wherein the vertical axis wind turbine further comprises a second blade extending along the housing vertically.

5. The device of claim 1, wherein the vertical axis wind turbine comprises a band and a bar, wherein the band extends around the housing, wherein the bar spans between the blade and the band.

6. The device of claim 1, wherein the vertical axis wind turbine comprises a photovoltaic cell, wherein at least one of the arm, the housing, or the blade comprises the photovoltaic cell.

7. The device of claims 6, wherein the vertical axis wind turbine comprises a power storage device coupled to at least one of the photovoltaic cell or the generator.

8. The device of claim 1, wherein the vertical axis wind turbine comprises a power storage device coupled to the generator.

9. The device of claim 1, wherein the housing is stationary with respect to the arm.

10. The device of claim 1, wherein the housing rotates with respect to the arm.

11. The device of claim 1, wherein the vertical axis wind turbine comprises a cap coupled to the arm and the housing such that the cap is positioned therebetween.

12. The device of claim 11, wherein the cap outputs a light therefrom.

13. The device of claim 12, wherein the light is based at least in part on the generator.

14. The device of claim 11, wherein the cap is stationary with respect to the arm.

15. The device of claim 1, wherein the vertical axis wind turbine comprises a bearing and a heater, wherein the housing is able to rotate based at least in part on the bearing, wherein the heater heats the bearing.

16. The device of claim 1, wherein the vertical axis wind turbine is a first vertical axis wind turbine, and further comprising a second vertical axis wind turbine coupled to the arm and the housing such that the second vertical axis wind turbine is positioned therebetween, wherein the second vertical axis wind turbine comprises a base and a rotor, wherein the base comprises a first magnet, wherein the rotor comprises a second magnet, wherein the rotor comprises a foil which spirals vertically, wherein the rotor is positioned adjacent to the base such that the first magnet is disposed adjacent to the second magnet and thereby causing the rotor to be suspended above the base, wherein the rotor and the blade rotate independently of each other.

17. The device of claim 16, wherein the foil comprises a photovoltaic cell.

18. The device of claim 16, wherein the foil spirals in a direction away from the housing toward the arm.

19. A method comprising:
 receiving energy from a vertical axis wind turbine comprising an arm that is cantilevered, a housing coupled to the arm, a generator housed within the housing, and a blade extending along the housing vertically, wherein the blade is propellable via a wind with respect to the arm about a vertical axis such that the arm is stationary with respect to the blade, wherein the arm is non-vertical with respect to the vertical axis.

20. A method comprising:
 sending energy from a vertical axis wind turbine comprising an arm that is cantilevered, a housing coupled to the arm, a generator housed within the housing, and a blade extending along the housing vertically, wherein the blade is propellable via a wind with respect to the arm about a vertical axis such that the arm is stationary with respect to the blade, wherein the arm is non-vertical with respect to the vertical axis.

* * * * *